United States Patent
Li et al.

(10) Patent No.: US 7,996,369 B2
(45) Date of Patent: Aug. 9, 2011

(54) METHOD AND APPARATUS FOR IMPROVING PERFORMANCE OF APPROXIMATE STRING QUERIES USING VARIABLE LENGTH HIGH-QUALITY GRAMS

(75) Inventors: Chen Li, Irvine, CA (US); Bin Wang, Shenyang (CN); Xaochun Yang, Shenyang (CN); Alexander Behm, Irvine, CA (US); Shengyue Ji, Irvine, CA (US); Jiaheng Lu, Beijing (CN)

(73) Assignee: The Regents of the University of California, Oakland, CA (US)

( * ) Notice: Subject to any disclaimer, the term of this patent is extended or adjusted under 35 U.S.C. 154(b) by 354 days.

(21) Appl. No.: 12/334,471

(22) Filed: Dec. 14, 2008

(65) Prior Publication Data

US 2010/0125594 A1    May 20, 2010

(51) Int. Cl.
*G06F 17/00* (2006.01)
(52) U.S. Cl. .......................... 707/673; 707/696; 707/688
(58) Field of Classification Search .................. 707/763, 707/696, 688
See application file for complete search history.

(56) References Cited

U.S. PATENT DOCUMENTS

2006/0265208 A1* 11/2006 Assadollahi ...................... 704/9
2008/0072143 A1* 3/2008 Assadollahi .................. 715/261

* cited by examiner

Primary Examiner — Sana Al-Hashemi
(74) Attorney, Agent, or Firm — Daniel L. Dawes; Marcus C. Dawes

(57) ABSTRACT

A computer process, called VGRAM, improves the performance of these string search algorithms in computers by using a carefully chosen dictionary of variable-length grams based on their frequencies in the string collection. A dynamic programming algorithm for computing a tight lower bound on the number of common grams shared by two similar strings in order to improve query performance is disclosed. A method for automatically computing a dictionary of high-quality grams for a workload of queries. Improvement on query performance is achieved by these techniques by a cost-based quantitative approach to deciding good grams for approximate string queries. An approach for answering approximate queries efficiently based on discarding gram lists, and another is based on combining correlated lists. An indexing structure is reduced to a given amount of space, while retaining efficient query processing by using algorithms in a computer based on discarding gram lists and combining correlated lists.

10 Claims, 19 Drawing Sheets

Before adding gram bin.

After adding gram bin.

| id | string |
|---|---|
| 1 | bingo |
| 2 | bit ingin |
| 3 | bit ing |
| 4 | boing |
| 5 | going |

Strings.

FIG. 1A

| gram | string ids |
|---|---|
| bi | 1,2,3 |
| bo | 4 |
| gi | 2 |
| go | 1,5 |
| in | 1,2,3,4,5 |
| it | 2,3 |
| ng | 1,2,3,4,5 |
| oi | 4,5 |
| ti | 2,3 |

Inverted lists.

FIG. 1B

```
Algorithm: DiscardLists
Input: Inverted lists L = {l_1, ... , l_n}
        Constraint B on the total list size
        Query workload Q = {Q_1, ... , Q_m}
Output: A set D of lists in L that are discarded
Method:
1.   D = ∅;
2.   WHILE (B < (total list size of L)) {
3.     FOR (each list l_i ∈ L) {
4.       Compute size reduction Δ^i_size if discarding l_i
5.       Compute difference of average query time Δ^i_time
               for queries in Q if discarding l_i
         }
6.     Use Δ^i_size 's and Δ^i_time 's of the lists to decide what
               lists to discard
7.     Add discarded lists to D
8.     Remove the discarded lists from L
       }
9.   RETURN D
```

*FIG. 6*

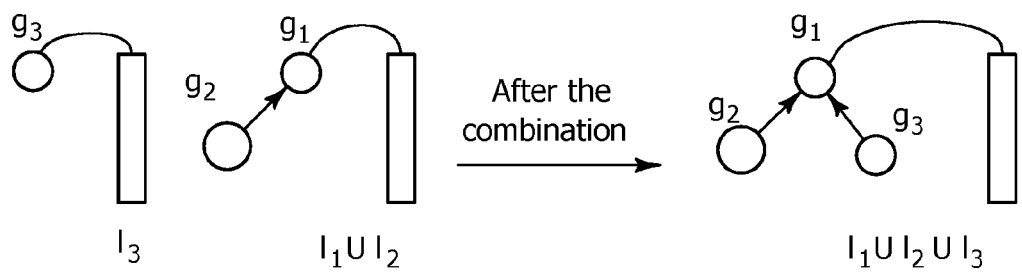

*FIG. 7*

Algorithm: CombineLists
Input: Candidate gram pairs P = {($g_i$, $g_j$)}
       Constraint B on the total list size
       Query workload $\mathcal{Q}$ = {$Q_1$, ..., $Q_m$}
Output: Combined lists.
Method:
1.     WHILE ((expected total index size) > B ) {
2.         FOR (each gram pair ($g_i$, $g_j$) ∈ P) {
3.            $l_i$ = current list of $g_i$
4.            $l_j$ = current list of $g_j$
5.            if ($l_i$ and $l_j$ are the same list as reference
6.                or corr ($l_i$, $l_j$) < $\delta$ )
7.                remove ($g_i$, $g_j$) from P and continue
8.            Compute size reduction $\Delta_{size}^{(l_i, l_j)}$ if combining $l_i$, $l_j$
9.            Compute difference of average query time $\Delta_{time}^{(l_i, l_j)}$
                for queries in $\mathcal{Q}$ if combining $l_i$, $l_j$
         }
10.    Use $\Delta_{size}^{(l_i, l_j)}$'s and $\Delta_{time}^{(l_i, l_j)}$'s of the gram pairs to decide
         which pair to combine
11.    Combine the two lists $l_i$ and $l_j$ based on the decision
12.    Remove the combined gram pair from P
     }

FIG. 9

```
Algorithm: VGEN
Input: Gram dictionary D, string s, bounds q_min, q_max
Output: a set of positional grams for s
(1)     position p = 1; VG = empty set;
(2)     WHILE (p ≤ |s| - q_min+1) {
(3)         Find a longest gram in D using the trie to match a
            substring t of s starting at position p;
(4)         IF (t is not found) t = s[p,p + q_min- 1];
(5)         IF (positional gram (p, t) is not subsumed by any
            positional gram in VG)
(6)             Insert (p, t) to VG;
(7)         p = p + 1;
        }
(8)     RETURN VG;
```

| id | NAGvector |
|----|-----------|
| 0 | 2,3 |
| 1 | 2,3 |
| 2 | 2,3 |
| 3 | 3,4 |

```
   FUNCTION Prune(Node n, Threshold T)
1.   IF (each child of n is not a leaf node) {
         // the root → n path is shorter than q_min
2.       FOR (each child c of n);
3.           CALL Prune(c, T); // recursive call
4.       RETURN;
5.   }
     // a gram corresponds to the leaf-node child of n
6.   L = the (only) leaf-node child of n;
7.   IF (n.freq ≤ T) {
8.       Keep L, and remove other children of n;
9.       L.freq = n.freq;
10.  }
11.  ELSE {
12.      Select a maximal subset of children of n (excluding L),
             so that the summation of their freq values and
             L.freq is still not greater than T;
13.      Add the freq values of these children to
             that of L, and remove these children from n;
14.      FOR (each remaining child c of n excluding L)
15.          CALL Prune(c, T); // recursive call
16.  }
```

Grams and PGB vector.

FIG. 17A

| Position | Affected grams |
|---|---|
| b | bi |
| i | bi, i i |
| i | bi, i i, in |
| n | in, nd |
| d | in, nd, di |
| i | di, ing |
| n | ing |
| g | ing |

Affected grams.

FIG. 17B

| gram | string ids |
|---|---|
| bi → | 1,2,3,4 |
| bo → | 5 |
| gi → | 3 |
| go → | 1,6 |
| in → | 2,3 |
| ing → | 1,3,4,5,6 |
| io → | 2 |
| it → | 3,4 |
| ng → | 2 |
| nn → | 2 |
| oi → | 2,5,6 |
| ti → | 3,4 |

Before adding gram g → After adding gram g

| id | string |
|---|---|
| 1 | bingo |
| 2 | bioinng |
| 3 | bitingin |
| 4 | biting |
| 5 | boing |
| 6 | going |

Strings.

FIG. 22A

| gram | string ids |
|---|---|
| bi | → 1,2,3,4 |
| bo | → 5 |
| gi | → 3 |
| go | → 1,6 |
| in | → 1,2,3,3,4,5,6 |
| io | → 2 |
| it | → 3,4 |
| ng | → 1,2,3,4,5,6 |
| nn | → 2 |
| oi | → 2,5,6 |
| ti | → 3,4 |

Inverted lists of string ids
(default gram dictionary $D_0$).

FIG. 22B

Algorithm: GramGen
Input: String collection S, query workload W, and $q_{min}$;
Output: a gram dictionary as a trie T.
Method:

(1)   Get a sample collection S' from strings in S;
(2)   Generate $q_{min}$-grams for strings in S';
(3)   Use the grams to construct a trie T;
(4)   Initialize each leaf node's complete list and (identical) local list of string ids using the generated grams;
(5)   Queue $Q$ = {leaf nodes in T};
(6)   WHILE ($Q$ is not empty) {
(7)       Queue for the next level: $Q_{new} = \emptyset$;
(8)       Recorder queue $Q$;
(9)       FOR (each node n in $Q$) {
(10)          n=$Q$.pop( ); // gram "g1" in Fig. 6(A)
(11)          Use strings on the complete list of n to add children to n by appending a character;
(12)          FOR (each child node c of n)
              // c corresponds to new gram "g" in Fig. 6(A)
(13)              Compute the complete and local lists of c using the complete list of n;
(14)              Find the node n' in T whose gram is the longest suffix of the gram for c;
                  // n' corresponds to gram "g2" in Fig. 6(A)
(15)              IF (Evaluate(T, n, c, n', W) returns "yes") {
                      // Add this new gram to the dictionary
(16)                  $Q_{new}$.push(c);
(17)                  Adjust local lists of n and n';
                  }
                  ELSE
                      // do not add this gram to the dictionary
(18)                  Remove node c and its lists;
                  } // "IF"
              } // "FOR"
(19)          Remove complete list of n; // no longer useful
          } // "FOR"
(20)      $Q=Q_{new}$; // process the next level
      } // "WHILE"
(21)  RETURN T;

FIG. 23

Before adding gram bin.

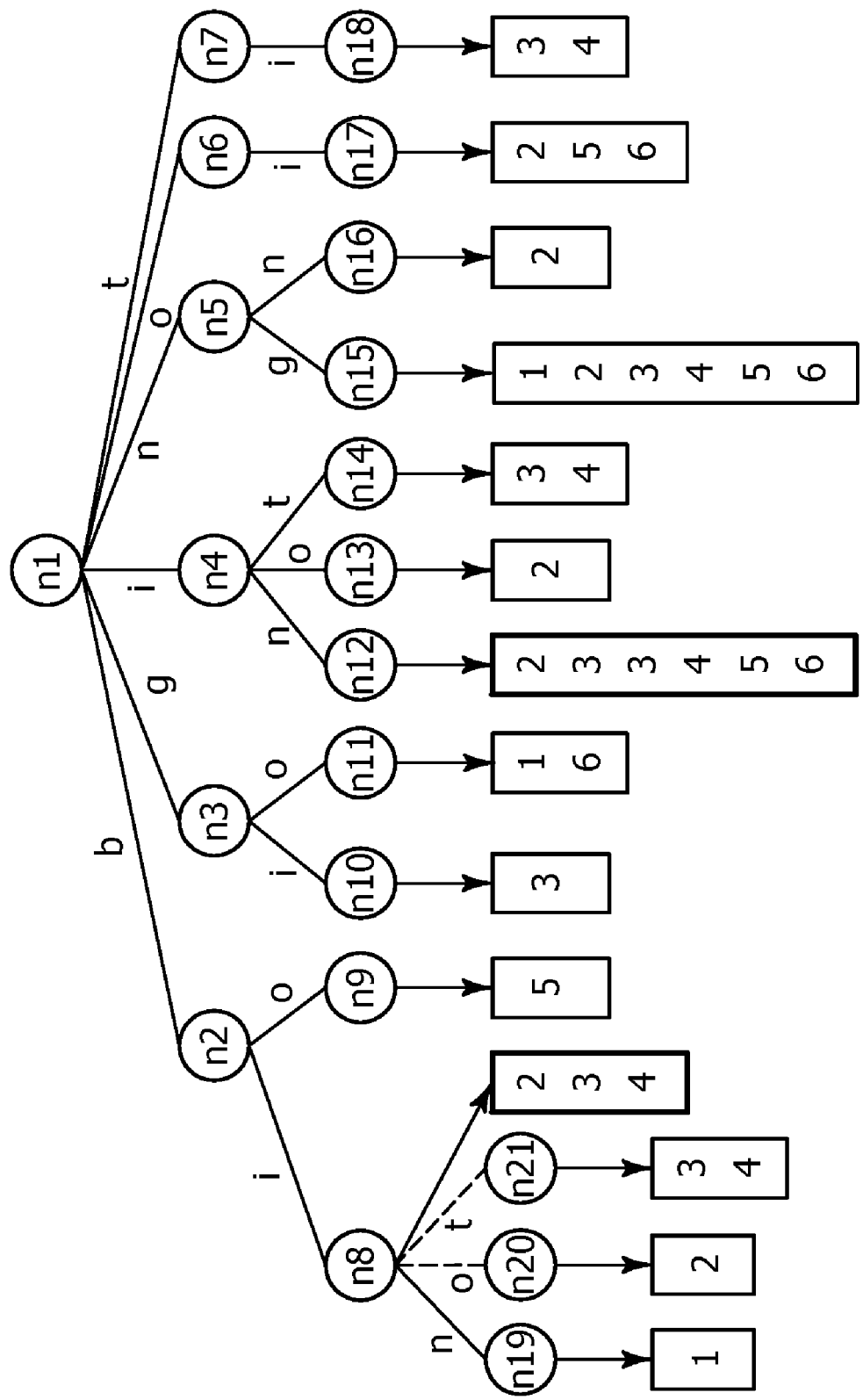
FIG. 24B  After adding gram bin.

METHOD AND APPARATUS FOR IMPROVING PERFORMANCE OF APPROXIMATE STRING QUERIES USING VARIABLE LENGTH HIGH-QUALITY GRAMS

GOVERNMENT RIGHTS

This invention was made with government support under grant 0238586 awarded by the National Science Foundation. The government has certain rights to this invention.

RELATED APPLICATIONS

The present application is related to U.S. Provisional Patent Application Ser. No. 60/988,330, filed on Nov. 15, 2007, which is incorporated herein by reference and to which priority is claimed pursuant to 35 USC 119.

BACKGROUND OF THE INVENTION

1. Field of the Invention

The invention relates to a method of making string searches in computer databases using gram-based inverted-list indexing structures.

2. Description of the Prior Art

In computerized data analysis methods and machines many applications need to solve the following problem of approximate string matching: from a collection of strings, find those that are similar to a given string, or those in another or possibly the same collection of strings.

Previous techniques convert a string to a set of fixed-length grams, and then use the grams to build indexing structures to do a search. The fixed length grams are substrings of a string to be used as signatures to identify similar strings. If a data set has grams that are very popular, these algorithms can and do have a very low performance.

Many information systems need to support approximate string queries: given a collection of textual strings, such as person names, telephone numbers, and addresses, find the strings in the collection that are similar to a given query string. The following are a few applications. In record linkage, we often need to find from a table those records that are similar to a given query string that could represent the same real-world entity, even though they have slightly different representations, such as Spielberg versus Spielburg.

In Web search, many search engines provide the "Did you mean" feature, which can benefit from the capability of finding keywords similar to a keyword in a search query. Other information systems such as Oracle and Lucene also support approximate string queries on relational tables or documents. Various functions can be used to measure the similarity between strings, such as edit distance (a.k.a. Levenshtein distance), Jaccard similarity, and cosine similarity.

Many algorithms are developed using the idea of "grams" of strings. A q-gram of a string is a substring of length q that can be used as a signature for the string. For example, the 2-grams of the string bingo are bi, in, ng, and go. These algorithms rely on an index of inverted lists of grams for a collection of strings to support queries on this collection. Intuitively, we decompose each string in the collection to grams, and build an inverted list for each gram, which contains the ID of the strings with this gram. For instance, FIG. 1 shows a collection of 5 strings and the corresponding inverted lists of their 2-grams.

The algorithms answer a query using the following observation: if a string r in the collection is similar enough to the query string, then r should share a certain number of common grams with the query string. Therefore, we decompose the query string to grams, and locate the corresponding inverted lists in the index. We find those string IDs that appear at least a certain number of times on these lists, and these candidates are post-processed to remove the false positives.

These gram-based inverted-list indexing structures are "notorious" for their large size relative to the size of their original string data. This large index size causes problems for applications. For example, many systems require a very high real-time performance to answer a query. This requirement is especially important for those applications adopting a Web-based service model. Consider online spell checkers used by email services such as Gmail, Hotmail, and Yahoo! Mail, which have millions of online users. They need to process many user queries each second. There is a big difference between a 10 ms response time versus a 20 ms response time, since the former means a throughput of 50 queries per second (QPS), while the latter means 20 QPS. Such a high-performance requirement can be met only if the index is in memory.

In another scenario, consider the case where these algorithms are implemented inside a database system, which can only allocate a limited amount of memory for the inverted-list index, since there can be many other tasks in the database system that also need memory. In both scenarios, it is very critical to reduce the index size as much as we can to meet a given space constraint.

BRIEF SUMMARY OF THE INVENTION

In the illustrated embodiment we disclose a new technique, called VGRAM, to improve the performance of string matching algorithms. One of its approaches is to use high quality grams of variable lengths from a collection of strings to support queries on the collection. These grams are judiciously chosen based on their frequencies in the strings, so that there are not too many strings sharing the same gram, and still we can filter out many dissimilar strings. Below we disclose how to generate variable-length grams, how to select high-quality grams, and what indexing structure is needed, and the relationship between the similarity of two similar strings and their number of shared variable-length grams.

A primary advantage of the disclosed VGRAM improvement is that it can be adopted by or incorporated into a plethora of approximate string search algorithms without the need to modify them substantially. We present extensive experiments on real data sets used to evaluate the improvement, and demonstrate the improvement (in both index size and query performance) on three representative existing algorithms. We also discuss how to use the technique for different variants of the edit distance function and how to use it inside a relational DBMS.

It can be used in applications such as spelt checking, data cleaning, and prevention of typosquatting. Typosquatting, also called URL hijacking, is a form of cybersquatting which relies on mistakes such as typographical errors made by Internet users when inputting a website address into a web browser. Should a user accidentally enter an incorrect website address, they may be led to an alternative website owned by a cybersquatter. Companies that need to support efficient approximate string matching will need such a technique. Applications include search engines, document-processing companies, and companies that need data management.

The method of the illustrated embodiment includes the steps of: generating grams of variable length for a string using a predefined set of grams, and; generating a corresponding indexing structure for these grams The method of the illustrated embodiment includes the steps of: generating a set of high-quality grams from a collection of strings based on an analysis of the gram frequencies The method of the illustrated embodiment includes the steps of: determining the relationship between the edit distance of two strings and a lower bound on the number of variable length grams shared by these two strings.

The method of the illustrated embodiment includes the steps of: integrating the VGRAM method of any one of the above claims into an existing algorithm without significant modifications of the algorithm The method of the illustrated embodiment includes the steps of: extending the method of any one of the above claims to variants of an edit distance function; and utilizing the edit distance function in a relational DBMS.

The method of the illustrated embodiment includes any one of above approaches including the step of using high quality grams of variable lengths from a collection of strings to support queries on the collection.

The method of the illustrated embodiment includes any one of above approaches including the step of judiciously choosing the grams based on their frequencies in the strings, so that there are not too many strings sharing the same gram, and so that many dissimilar strings can still be filtered out.

The method of the illustrated embodiment includes any one of above approaches including generating variable-length grams, selecting high-quality grams, generating an indexing structure, and determining the relationship between the similarity of two similar strings and their number of shared variable-length grams.

The method of the illustrated embodiment includes any one of above approaches including the step of spell checking, data cleaning, and/or preventing typosquatting.

The illustrated embodiment includes an apparatus for performing the method of any one of the above approaches, and/or a memory medium for storing a plurality of instructions for controlling a computer to perform the method of any one of the above approaches.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 6 is a pseudocode listing for DiscardLists which is a cost-based algorithm for choosing inverted lists to discard.

FIG. 7 is a diagram illustrating the combining list of substring $g_2$ with the list of substring $g_3$ using Union-Find.

FIG. 9 is a pseudocode listing for CombineLists which is a Cost-based algorithm to select gram pairs to combine.

FIG. 11a is a table of the strings, FIG. 11b is the gram dictionary D as a trie, FIG. 11c is the reversed gram trie, and FIG. 11d are the corresponding NAG vectors.

FIG. 14 is a pseudocode listing of Prukne(Node n, Threshold T), an algorithm to prune a subtrie to select grams.

FIGS. 17a and 17b are diagrams illustrating the idea of a position-gram-bound (PGB) vector. FIG. 17a shows a gram and the PGB vector and FIG. 17b is a table showing the affected grams.

FIG. 20a shows extending of gram $g_1$ to g and FIG. 20b gives a specific example of such an extension.

FIGS. 22a and 22b illustrate strings and their inverted lists. FIG. 22a is a table showing the strings and FIG. 22b is an inverted list of the strings of FIG. 22a comprising a default dictionary $D_0$.

FIG. 23 is a pseudocode listing of the algorithm GramGen which generates a gram dictionary.

FIGS. 24a and 24b are diagrams of one step in the process of adding a gram in GramGen in FIG. 23. The lists with thicker lines are modified. Each dotted line points to a child which potentially could be added.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1C:
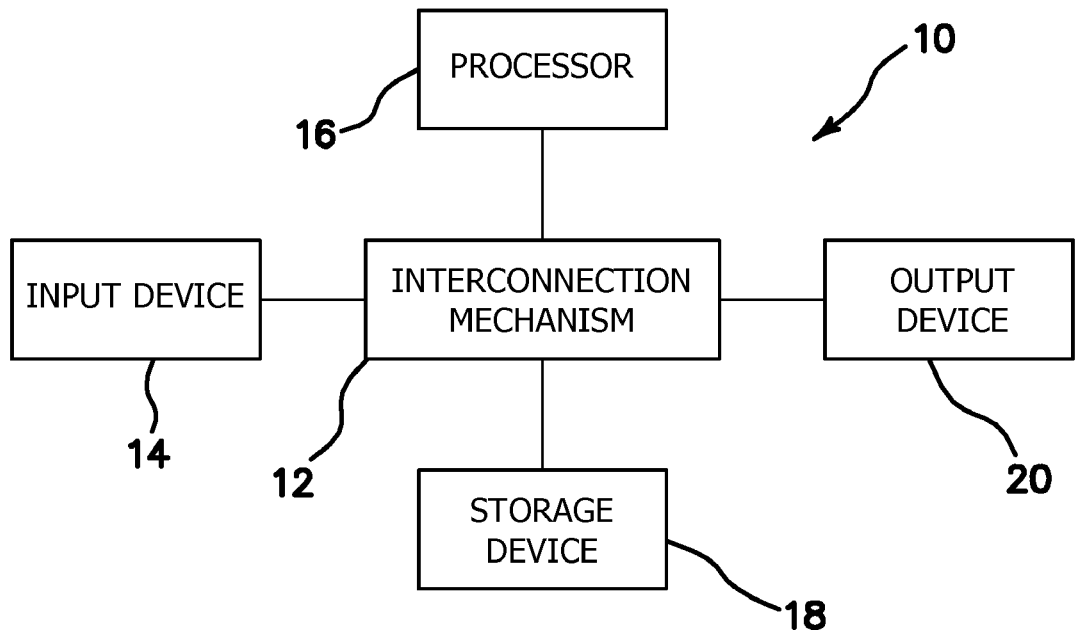
FIGS. 1a and 1b are prior art diagrams illustrating a simple, short string list and inverted gram list corresponding thereto.

The illustrated embodiment of the present invention generally comprises a system and method for searching and matching input search data against a database of records. The invention may be implemented on a conventional computer system such as that represented in FIG. 1a. It is to be understood that the present invention may be employed in any digital processing circuit and is not limited to systems of the organization shown in FIG. 1a. For example, use in satellite, cell or mobile phones which process or communicate digital signals is expressly included. Computer system 10 of FIG. 1a is represented by a set of generic components 12, 14, 16, 18 and 20 as found in most general-purpose computers. In particular, computer system 10 comprises an interconnection mechanism 12 such as a bus or circuitry which couples an input device 14 (such as a keyboard), a processor 16 (such as a microprocessor), a storage device 18 (such as a computer disk or memory) and an output device 20 (such as a monitor or screen). Various embodiments of the invention will be described below in conjunction with these components, interconnected in the manner shown in FIG. 1a.

Many applications need to solve the following problem of approximate string matching: from a collection of strings, how to find those similar to a given string, or the strings in another (possibly the same) collection of strings? Many algorithms are developed using fixed-length grams, which are substrings of a string used as signatures to identify similar strings. In this disclosure we develop a novel technique, called VGRAM, to improve the performance of these algorithms. One of its guiding notions is to judiciously choose high-quality grams of variable lengths from a collection of strings to support queries on the collection. We give a full specification of this technique, including how to select high-quality grams from the collection, how to generate variable-length grams for a string based on the preselected grams, and what is the relationship between the similarity of the gram sets of two strings and their edit distance. A primary advantage of the technique is that it can be adopted by a plethora of approximate string algorithms without the need to modify them substantially.

Since textual information is prevalent in information systems, many applications have an increasing need to support approximate string queries on data collections. Such queries ask for, from a given collection of strings, those strings that are similar to a given string, or those from another (possibly the same) collection of strings. This collection could be the values from a column in a table, a set of words in a dictionary, or a set of predefined entity names such as company names and addresses. The following are several examples.

Data Cleaning: Information from multiple data sources can have various inconsistencies. The same real-world entity can be represented in slightly different formats, such as \PO Box 23, Main St." and \P.O. Box 23, Main St". There could be even errors in the data due to the process it was collected. For these reasons, data cleaning often needs to find from a collection of entities those similar to a given entity, or all similar pairs of entities from two collections.

Query Relaxation: When a user issues an SQL query to a DBMS, her input values might not match those interesting entries exactly, due to possible errors in the query, inconsistencies in the data, or her limited knowledge about the data. By supporting query relaxation, we can return the entries in the database (e.g., \Steven Spielburg)" that are similar to a value in the query (e.g., \Steve Spielberg"), so that the user can find record her.

Spellchecking: Given an input document, a spellchecker finds potential candidates for a possibly mistyped word by searching in its dictionary those words similar to the word.

Prior art techniques assume a given similarity function to quantify the closeness between two strings. Different string-similarity functions have been proposed, such as edit distance, Jaro metric, and token-based cosine metric. Among them, edit distance is a commonly used function due to its applicability in many applications. Many algorithms have focused on approximate string queries using this function. The idea of grams has been widely used in these algorithms.

A gram is a substring of a string that can be used as a signature of the string. These algorithms rely on index structures based on grams and the corresponding searching algorithms to find those strings similar to a string.

Figures 10, 12:
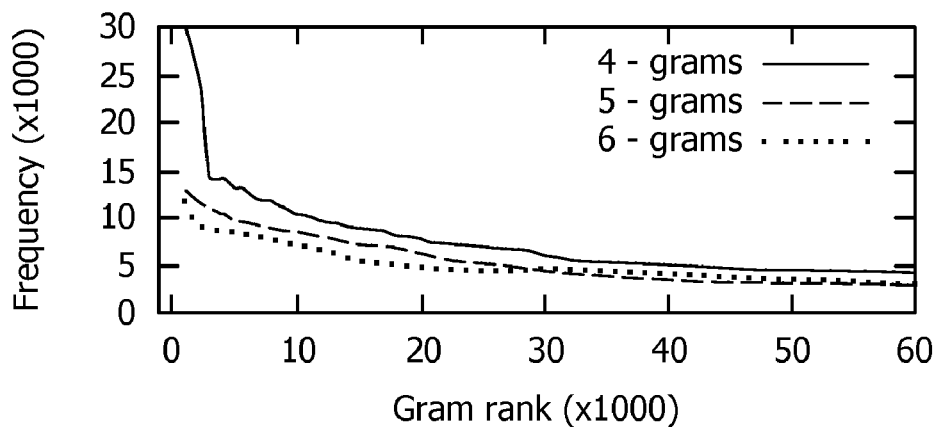
FIG. 10 is a graph of the gram frequencies in DBLP titles.
FIG. 12 is a pseudocode listing of VGEN, an algorithm to decompose a string to positional grams of variable length using a gram dictionary.

There is a dilemma in choosing the gram length. The gram length can greatly affect the performance of these algorithms. As an example, FIG. 10 shows the distributions of the gram frequencies for different gram lengths for a DBLP data set of 276,699 article titles. The x-axis is the rank of a gram based on its frequency, and the y-axis is the frequency of the gram. The distributions show that there are some grams that are very popular in the data set. For instance, the 5-gram "ation" appeared 113,931 times! Other popular 5-grams include "tions", "ystem", "ting", and "catio". As a consequence, any given string has a good chance of including a popular gram. Similar distributions were observed in other data sets as well. Algorithms based on fixed-length grams have a dilemma in deciding the length of grams. As an illustrative example, consider prior art algorithms that are based on an inverted-list index structure to find similar strings These algorithms use various filtering techniques to prune strings.

One important prior art filter is called "count filter," which uses the following fact. If the edit distance between two strings is within a threshold, then they should share enough common grams. A lower bound of the number of common grams depends on the length of the grams and the edit distance threshold. If we increase the gram length, there could be fewer strings sharing a gram, causing the inverted lists to be shorter. Thus it may decrease the time to merge the inverted lists. On the other hand, we will have a lower threshold on the number of common grams shared by similar strings, causing a less selective count filter to eliminate dissimilar string pairs. The number of false positives after merging the lists will increase, causing more time to compute their real edit distances (a costly computation) in order to verify if they are in the answer to the query. The dilemma also exists in spirit in other prior art algorithms as well.

The dilemma is due to the "one-for-all" principle used in these prior art algorithms. Based on this observation, in this disclosure we develop a technique, called VGRAM, to improve the performance of these prior art algorithms. One of its main ideas is to judiciously choose high-quality grams of variable lengths from a collection of strings to support queries on the collection. At a high level, VGRAM can be viewed as an index structure associated with a collection of strings, on which we want to support approximate queries.

An overview of the technique is the following. We analyze the frequencies of variable-length grams in the strings, and select a set of grams, called a gram dictionary, such that each selected gram in the dictionary is not too frequent in the strings. For a string, we generate a set of grams of variable lengths using the gram dictionary. We can show that if two strings are within edit distance k, then their sets of grams also have enough similarity, which is related to k. This set similarity can be used to improve the performance of existing algorithms.

We study several challenges that arise naturally when using this simple but powerful idea. (1) How to generate variable-length grams for a string? For the case of using fixed-length grams, it is straightforward to generate grams for strings, but the answer is not obvious in the case of variable length grams. We show how to generate such grams using a precomputed gram dictionary. (2) How to construct a high-quality gram dictionary? The selected grams can greatly affect the performance of queries. We develop an efficient algorithm for generating such a gram dictionary based on an analysis of gram frequencies. (3) What is the relationship between the similarity of the gram sets of two strings and their string similarity? The relationship is no longer clear as compared to the fixed-length-gram case, since the strings can generate grams with different lengths. We show that such a relationship still exists, and the analysis is technically very nontrivial. (4) How to adopt VGRAM in existing algorithms? A primary advantage of the VGRAM technique is that it can be used by a plethora of approximate string algorithms without substantially modifying the algorithms. We use three existing algorithms in the literature to show how to adopt the technique. It is worth mentioning that when adopting VGRAM in these algorithms, it guarantees that it does not miss true answers, i.e., there are no false negatives. We have conducted extensive experiments to evaluate the technique. The technique can be adopted easily by these algorithms and achieve a significant improvement on their performance. The technique can also greatly reduce the index size of those algorithms based on inverted lists, even after considering the small index overhead introduced by the technique. In addition, the index structure used by the technique can be easily maintained dynamically, and be utilized for algorithms inside relational database management systems (DBMS). The technique is extendable to variants of the edit distance function.

In the literature "approximate string matching" also refers to the problem of finding a pattern string approximately in a text. There have been many studies on this problem. The problem studied in this disclosure is different: searching in a collection of strings those similar to a single query string ("selection") or those similar to another collection of strings ("join"). In this disclosure we use "approximate string matching" to refer to our problem.

Many prior art algorithms for supporting approximate string queries use an inverted-list index structure of the grams in strings, especially in the context of record linkage. Various filtering techniques are proposed to improve their performance. These techniques can be adopted with modifications inside a relational DBMS to support approximate string queries using SQL. Motivated by the need to do fuzzy queries, several prior art algorithms have been proposed to support set-similarity joins. These algorithms find, given two collections of sets, those pairs of sets that share enough common elements. These algorithms can be used to answer approximate queries due to the relationship between string similarity and the similarity of their gram sets. We will give a detailed description of some of these prior art algorithms below. Our VGRAM technique can be used in these prior art algorithms to improve their performance.

The idea of using grams of variable lengths has been used in other applications such as speech recognition, information retrieval, and artificial intelligence. The same idea has also been considered in the database literature for the problem of substring selectivity estimation for the SQL LIKE operator. For instance, the concept of "shortest identifying substring" whose selectivity is very similar to that of its original string has previously been proposed. Others studied how to choose, in a suffix tree, a set of strings whose frequency (or "count") is above a predefined threshold due to a storage constraint. It is based on the assumption that low-frequency substrings are relatively less important for substring selectivity estimation. Compared to these earlier studies, ours is the first one using this idea to answer approximate string queries on string collections. Since our addressed problem is different, our approach to selecting variable-length grams is also different from previous ones. In addition, our results on analyzing similarity between the gram sets of two similar strings and adopting VGRAM in existing algorithms are also novel.

Others have proposed a technique called "n-Gram/2L" to improve space and time efficiency for inverted index structures. Still others have studied approximate substring matching and proposed a method of storing grams as a trie without losing any information. Compared to these two prior art studies, our work focuses on approximate string queries on string collections and the corresponding filtering effect of variable-length grams. Another related work is a recent study on approximate string joins using functions such as cosine similarity.

Consider first some preliminaries. Let $\Sigma$ be an alphabet. For a string s of the characters in $\Sigma$, we use "|s|" denote the length of s, "s[i]" to denote the i-th character of s (starting from 1), and "s[i, j]" to denote the substring from its i-th character to its j-th character.

Consider Q-Grams. Given a string s and a positive integer q, a positional q-gram of s is a pair (i, g), where g is the q-gram of s starting at the i-th character, i.e., $g=s[i, i+q-1]$. The set of positional q-grams of s, denoted by G(s, q), is obtained by sliding a window of length q over the characters of string s. There are $|s|-q+1$ positional q-grams in G(s, q). For instance, suppose q=3, and s=university, then G(s, q)={(1, uni), (2, niv), (3, ive), (4, ver), (5, ers), (6, rsi), (7, sit), (8, ity)}. According to this definition, we introduce two characters $\alpha$ and $\beta$ that do not belong to $\Sigma$, and extend a string by prefixing q−1 copies of $\alpha$ and suffixing q−1 copies of $\beta$. We use a sliding window of size q on the new string to generate positional q-grams. All the results in this disclosure carry over to this definition as well, with necessary minor modifications.

Consider approximate string queries. The edit distance (a.k.a. Levenshtein distance) between two strings $s_1$ and $s_2$ is the minimum number of edit operations of single characters that are needed to transform $s_1$ to $s_2$. The edit operations are insertion, deletion, and substitution in this embodiment. We denote the edit distance between $s_1$ and $s_2$ as ed($s_1$, s2). For example, ed("Steven Spielburg", "Steve Spielberg")=2. We consider two types of approximate string queries on a given collection of strings S (possibly with duplicates). (1) Approximate-string selections: for a query string Q, find all the strings s in S such that ed(Q, s)·k, where k is a given distance threshold. (2) Approximate-string joins: given a collection S' (possibly the same as S), find string pairs in S×S' whose edit distance is not greater than a threshold k.

Consider now variable length grams. Let S be a collection of strings, on which we want to use VGRAM. The technique uses two integer parameters, qmin and qmax, such that qmin<$q_{max}$, and we consider grams of lengths between qmin and $q_{max}$. We study how to convert a string to a set of variable-length grams, by using a predefined set of grams, called a "gram dictionary," which is obtained from S. We then will study how to construct such a gram dictionary from S.

Figures 11A, 11B:
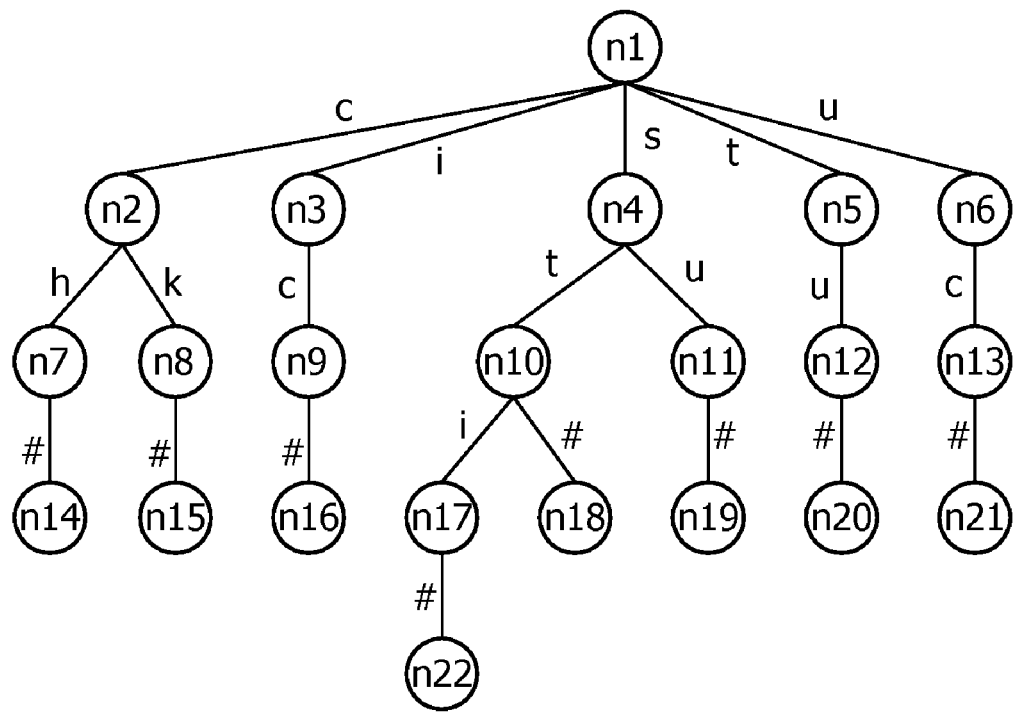
FIGS. 11a-11d are diagrams of a VGRAM index for strings.
Figures 11C, 11D:
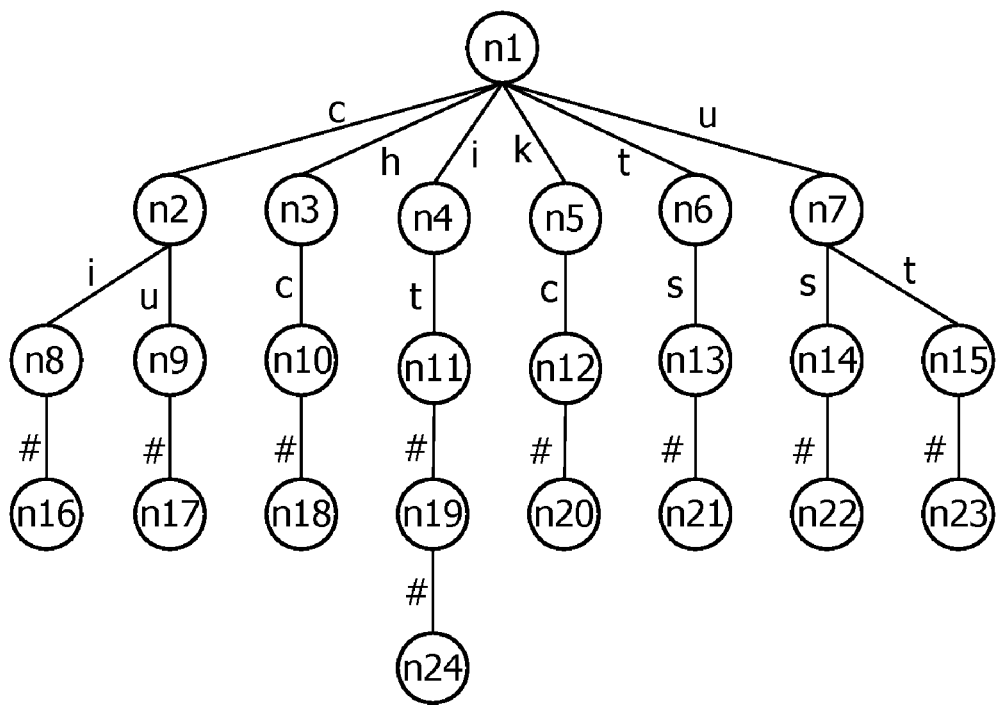

Consider the gram dictionary. If a gram $g_1$ is a proper prefix of a gram $g_2$, we call $g_1$ a prefix gram of $g_2$, and $g_2$ an extended gram of $g_1$. For instance, the gram uni is a prefix gram of univ, while the latter is an extended gram of the former. A gram dictionary is a set of grams D of lengths between qmin and $q_{max}$. Notice that the gram dictionary could be constructed independently of a collection of strings S, even though for performance reasons we tend to compute a gram dictionary by analyzing gram frequencies of the string collection. A gram dictionary D can be stored as a trie. The trie is a tree, and each edge is labeled with a character. To distinguish a gram from its extended grams, we preprocess the grams in D by adding to the end of each gram a special endmarker symbol that does not belong to the alphabet $\Sigma$, e.g.; #. A path from the root node to a leaf node corresponds to a gram in D. (The endmarker symbol is not part of the gram.) We call this gram the corresponding gram of this leaf node. In addition, for each gram in D, there is a corresponding root-to-leaf path on the trie. For example, FIG. 11b shows a trie for a gram dictionary of the four strings in FIG. 11a, where $q_{min}$=2 and qmax=3. (FIGS. 11b-d show a VGRAM index for the strings. The rest of the index will be below. The dictionary includes the following grams: fch, ck, ic, sti, st, su, tu, ucg. The path $n_1 \rightarrow n_4 \rightarrow n_{10} \rightarrow n_{17} \rightarrow n_{22}$ corresponds to the gram sti.

Consider how to generate variable length grams. For the case of using a fixed gram length q, we can easily generate the set of q-grams for a string by sliding a window of size q over the string from left to right. When using a gram dictionary D to generate a set of variable-length grams for a string s, we still use a window to slide over s, but the window size varies, depending on the string s and the grams in D. Intuitively, at each step, we generate a gram for the longest substring (starting from the current position) that matches a gram in the dictionary. If no such gram exists in D, we will generate a gram of length $q_{min}$. In addition, for a positional gram (a, g) whose corresponding substring s[a, b] has been subsumed by the substring s[a', b'] of an earlier positional gram (a', g'), i.e., a'≦a≦b≦b', we ignore the positional gram (a, g).

Formally, we decompose string s to its set of positional grams using the algorithm VGEN in FIG. 12. We start by setting the current position to the first character of s. In each step, from the current position, we search for the longest substring of s that appears in the gram dictionary D using the trie. If we cannot find such a substring, we consider the substring of length $q_{min}$ starting from this position. In either case, we check if this substring is a proper substring of one of the already-produced substrings (considering their positional information in s). If so, we do not produce a positional gram for this new substring, since it has already been subsumed by an earlier positional gram. Otherwise, we produce a positional gram for this substring. We move the current position to the right by one character. We repeat the step above until the position is greater than |s|−$q_{min}$+1. The generated set of positional grams for a string s is de-noted by VG(s, D, $q_{min}$, qmax), or simply VG(s) if the other parameters are clear in the context.

For example, consider a string s=universal and a gram dictionary D=fni, ivr, sal, uni, versg. Let $q_{min}$ be 2 and qmax be 4. By setting p=1 and G={ }, the algorithm starts at the first character u. The longest substring starting at u that appears in D is uni. Thus the algorithm produces a positional gram (1, uni) and inserts it to VG. Then the algorithm moves to the next character n. Starting from this character, the longest substring that appears in D is ni. However, since this candidate positional gram (2, ni) is subsumed by the previous one, the algorithm does not insert it into VG. The algorithm moves to the next character i. There is no substring starting at this character that matches a gram in D, so the algorithm produces a positional gram (3, iv) of length $q_{min}$=2. Since it is not subsumed by any positional gram in VG, the algorithm inserts it to VG. The algorithm repeats until the position is at the (|s|−$q_{min}$+2)-nth character, which is the character l. The generated positional gram set is VG={(1, uni), (3, iv), (4, vers), (7, sal)}.

Turn now to the construction of the gram dictionary. For a given collection S of strings, how to decide a high-quality gram dictionary. We assume the two length bounds $q_{min}$ and $q_{max}$ are given, and later we will discuss how to choose these two parameters. We develop an efficient two-step algorithm to achieve the goal. In the first step, we analyze the frequencies of q-grams for the strings, where q is within $q_{min}$ and $q_{max}$. In the second step, we select grams with a small frequency.

Turn now to step 1, collecting gram frequencies. One naive way to collect the frequencies is the following. For each string s in S, for each q between $q_{min}$ and $q_{max}$, we generate all its q-grams of s. For each q-gram, we count its frequency. This approach is computationally expensive, since it generates too many grams with their frequencies. To solve this problem, our algorithm uses a trie (called "frequency trie") to collect gram frequencies. The algorithm avoids generating all the grams for the strings based on the following observation. Given a string s, for each integer q in [$q_{min}$, $q_{max}$−1], for each positional q-gram (p, g), there is a positional gram (p, g') for its extended $q_{max}$-gram g'. For example, consider a string university, and its positional gram (2, niv). Let $q_{min}$=2 and $q_{max}$=4. There is also a positional 4-gram (2, nive) starting at the same position. Therefore, we can generate $q_{max}$-grams for the strings to do the counting on the trie without generating the shorter grams, except for those grams at the end of a string.

Based on this observation, the algorithm collects gram frequencies as follows. Each node n in the frequency trie has a frequency value n.freq. We initialize the frequency trie to be empty. For each string s, we first generate all its positional $q_{max}$-grams. For each of them, we locate the corresponding leaf node, or insert it to the trie if the gram does not exist (the frequency for this leaf node is initialized to 0). For each node on the path from the root to this leaf node, including this leaf node, we increment its frequency by 1. At each q-th node ($q_{min}$≦q≦$q_{max}$) on the path, we create a leaf node by appending an edge with the special endmarker symbol #, if this new leaf node does not exist. This new leaf node represents the fact that the $q_{max}$-gram has a prefix gram of length q that ends at this new leaf node. Notice that for the leaf node n' of each such prefix gram, we do not increment the frequency of n' by 1 since its parent node already did the counting. We deal with those characters at the end of the string separately, since they do not produce positional $q_{max}$-grams. In particular, for each position p=|s|−$q_{max}$+2, : : : , |s|−$q_{min}$+1 of the string, we generate a positional gram of length |s|−p+1, and repeat the same procedure on the trie as described above. For instance, if $q_{min}$=2 and $q_{max}$=4, for the string s=university, we need to generate the following positional grams (8, ity) and (9, ty) of length between 2 and 3, and do the counting on the trie.

Figure 13:
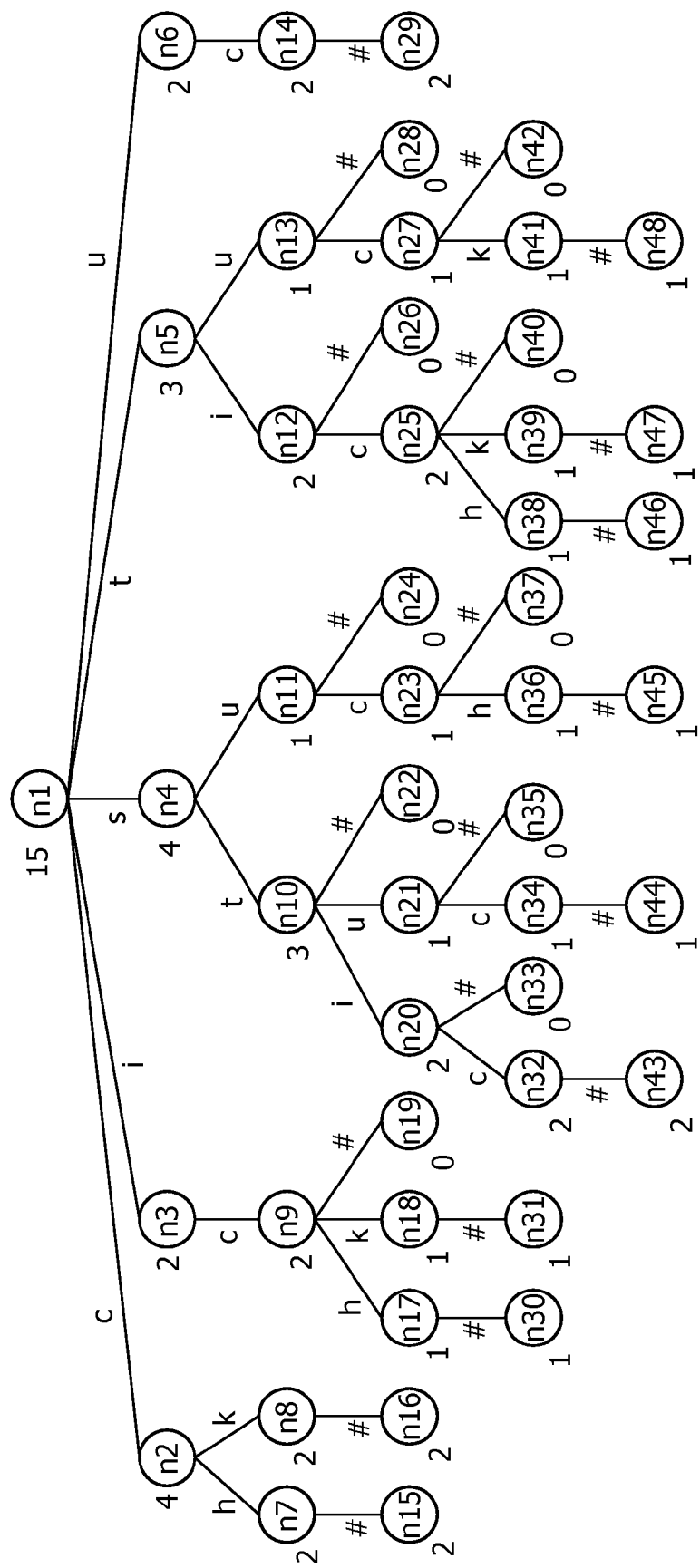
FIG. 13 is a gram-frequency trie.

After step 1, we have constructed a trie with a frequency in each node. For example, FIG. 13 shows the frequency trie for the strings in FIG. 11a. For instance, the frequency number "2" at node n43 means that the gram stic occurred 2 times in the strings. The frequency number "3" at node n10 means that the gram st appears 3 times.

Turn to step 2, selecting high quality grams. In this step, we judiciously prune the frequency trie and use the remaining grams to form a gram dictionary. The intuition of the pruning process is the following. (1) Keep short grams if possible: If a gram g has a low frequency, we eliminate from the trie all the extended grams of g. (2) If a gram is very frequent, keep some of its extended grams. As a simple example, consider a gram ab. If its frequency is low, then we will keep it in the gram dictionary. If its frequency is very high we will consider keeping this gram and its extended grams, such as aba, abb, abc, etc. The goal is that, by keeping these extended grams in the dictionary, the number of strings that generate an ab gram by the VGEN algorithm could become smaller, since they may generate the extended grams instead of ab.

Formally, we choose a frequency threshold, denoted by T. We prune the trie by calling the function Prune shown in FIG. 14, by passing as the parameters the root of the frequency trie and the threshold T. At each step, we check if the current node n has a leaf-node child. (A leaf node has, from its parent, an edge labeled by the endmarker symbol #.) If it does not have any leaf-node child, then the path from the root to this node corresponds to a gram shorter than $q_{min}$, so we recursively call the function for each of its children.

If this node has a leaf-node child L, then there is a gram g corresponding to L. We consider the frequency of node n, i.e., n.freq. If it is already not greater than T, then we keep this gram. In addition, we remove the children of n except L, and assign the frequency of n to L. After this pruning step, node n has a single leaf-node child L. If n.freq>T, we want to keep some of its extended grams of g, hoping the new frequency at node L could be not greater than T. The algorithm selects a maximal sub-set of n's children (excluding L), so that the summation of the frequencies of these nodes and L.freq is still not greater than T. (Intuitively, the node L is "absorbing" the frequencies of the selected children.) For the remaining children (excluding L), we recursively call the function on each of them to prune the subtree. The following are three possible pruning policies to be used to select a maximal subset of children to remove (line 12).

SmallFirst: Choose children with the smallest frequencies.
LargeFirst: Choose children with the largest frequencies.
Random: Randomly select children so that the new L.freq after absorbing the frequencies of the selected children is not greater than T.

Figure 2:
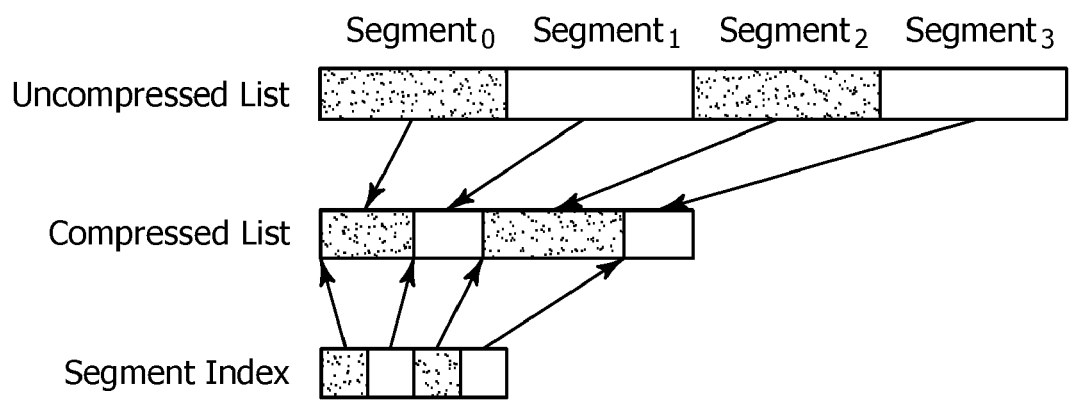
FIG. 2 is a diagram illustrating the adaptation of the illustrated embodiment of the invention into data compression schemes using indexing and segmenting.

For instance, in the frequency trie in FIG. 13, assume threshold T=2. As the algorithm traverses the trie top down, it reaches n10, whose frequency 3 is greater than T. The node has a single leaf child node, n22, whose frequency is 0, meaning there is no substring of st in the data set with-out an extended gram of st. The node n10 has two other children, n20 with a frequency 2 and n21 with a frequency 1. By using the SmallFirst policy, the algorithm chooses n21 to prune, and updates the frequency of n22 to 1. By using LargeFirst, the algorithm chooses n20 to prune, and updates the frequency of n22 to 2. By using Random, the algorithm randomly chooses one of these two children to prune, and adds the corresponding frequency to that of n22. FIG. 2(*b*) shows the final trie using the Random policy.

Notice that it is still possible for this algorithm to select grams with a frequency greater than T. This threshold is mainly used to decide what grams to prune. The frequencies of the selected grams also depend on the data set itself. For instance, consider the case where we had a collection of N identical strings of abc. No matter what the threshold T is, each selected gram must have the same frequency, N. When we adopt VGRAM in existing algorithms, our technique does guarantee no false negatives.

Consider how we decide $q_{min}$ and $q_{max}$. We assumed parameters $q_{min}$ and $q_{max}$ are given before constructing the trie to decide a gram dictionary. If these values are not given, we can initially choose a relatively small $q_{min}$ and large $q_{max}$, and run the algorithm above to decide a gram dictionary. After that, we can change $q_{min}$ and $q_{max}$ to the length of the shortest and the longest grams in the dictionary, respectively. Below we will show how T and $g_{max}$ can be automatically determined without user input and only $q_{min}$ is heuristically chosen.

Consider similarity of gram sets. We now study the relationship between the similarity of two strings and the similarity of their gram sets generated using the same gram dictionary. Turning first to fixed length grams. We first revisit the relationship between the similarity of the sets of fixed-length grams of two strings and their edit distance. From a string's perspective, k edit operations can in worst case "touch" k×q grams of the string. As a consequence, if two strings $s_1$ and $s_2$ have an edit distance not greater than k, then their sets of positional grams $G(s_1, q)$ and $G(s_2, q)$ should share at least the following number of common grams (ignoring positional information):

$$B_c(s_1,s_2,q,k)=\max\{|s_1|,|s_2|\}-q+1-k\cdot q: \qquad (1)$$

It has previously been shown in the art that for each string, we represent its set of grams of length q as a bit vector (ignoring positional information). For two strings within an edit distance k, the hamming distance of their corresponding bit vectors is not greater than the following string-independent hamming-distance bound.

$$B_h(s_1,s_2,q,k)=2\cdot k\cdot q \qquad (2)$$

Figure 15:
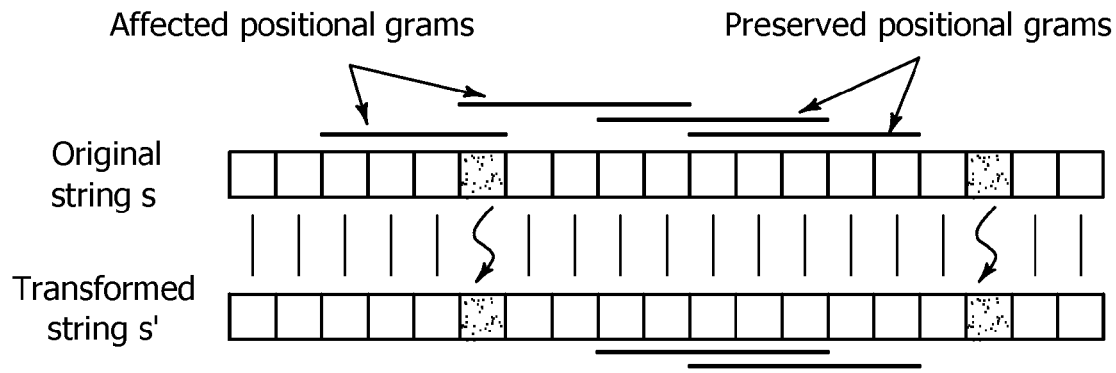
FIG. 15 is a diagram illustrating preserved positional grams versus affected positional grams.

Consider the effect of edit operations on grams. Now let us consider variable-length grams. For two strings s and s', let VG(s) and VG(s') be their positional gram sets generated based on a gram dictionary D with two gram-length parameters $q_{min}$ and $q_{max}$. FIG. 15 shows the effect of edit operations on the string s. For each character s[i] in s that is aligned with a character s'[j] in s', if there is positional gram (i, g) in VG(s), and there is a positional gram (j, g) in VG(s'), such that |i−j|≦ed(s, s'), we call (i, g) a preserved positional gram. Other positional grams in VG(s) are called affected positional grams. Our goal is to compute the number of preserved positional grams in VG(s) after k edit operations, even if we do not know exactly what the transformed string s' is. The affected positional grams due to an edit operation depend on the position of the gram and the edit operation. Next we will analyze the effect of an edit operation on the positional grams.

Figure 16:
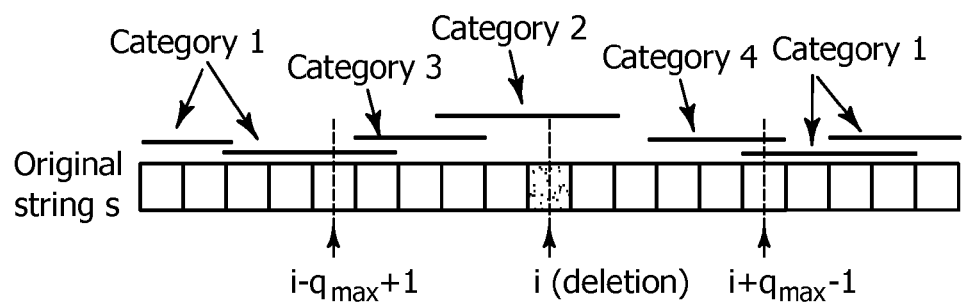
FIG. 16 is a diagram illustrating four categories of positional grams based on whether they can be affected by a deletion operation on the ith character.

Consider a deletion operation on the i-th character of s, and its effect on each positional gram (p, g) that belongs to one of the following four categories, as illustrated in FIG. 16.

Category 1: Consider the following window [a, b] including the character s[i], where a=max{1, i−$q_{max}$+1}, and b=min{|s|, i+$q_{max}$−1}. If the positional gram (p, g) is not contained in this window, i.e., p<i−$q_{max}$+1 or p+|g|−1>i+$q_{max}$−1, this deletion does not affect the positional gram.

Category 2: If the positional gram overlaps with this character, i.e., p≦i≦p+|g|−1, then it could be affected by this deletion.

Category 3: Consider a positional gram (p, g) on the left of the i-th character, and contained in the window [a, i−1], i.e. i−$q_{max}$+1≦p<p+|g|−1≦i−1. These positional grams could be potentially affected due to this deletion. To find out which positional grams could be affected, we do the following. Consider the position j=a, and the substring s[j, i−1]. If this substring is a prefix of a gram g' in the dictionary D, then all the positional grams contained in the interval [j, i−1] could be potentially affected due to the deletion. The reason is that these positional grams could be subsumed by a longer substring (see Line 5 in FIG. 12). We mark these positional grams "potentially affected." If no extended gram g' exists in the dictionary, this deletion does not affect this positional gram (p, g). We increment the position j by one, and repeat the checking above, until we find such a gram g' in D, or when j=i−$q_{min}$+1.

Category 4: Symmetrically, consider a positional gram (p, g) on the right of the i-th character, and contained in the window [i+1, b], i.e., i+1≦p<p+|g|−1≦i+$q_{max}$−1. These positional grams could be potentially affected due to this deletion. To find out which grams could be affected, we do the following. Consider the position j=b, and the sub-string s[i+1, j]. If there is a gram g' in the dictionary such that g is a suffix of g', then all the positional grams contained in the interval [i+1, j] could be potentially affected due to the deletion, for the same reason described above. We mark these positional grams "potentially affected." If no extended gram g' exists in the dictionary, this deletion does not affect this positional gram (p, g). We decrement the position j by one, and repeat the checking above, until we find such a gram g' in D, or when $j=i+q_{min}-1$.

For instance, consider the example above where we have a string s=universal, a gram dictionary D=fni, ivr, sal, uni, versg, $q_{min}=2$, and $q_{max}=4$. The generated positional gram set is VG(s)={(1, uni), (3, iv), (4, vers), (7, sal)}. Consider a deletion on the 5-th character e in the string s. In the analysis of the four categories, we have i=5, $i=q_{max}+1=2$, So a=2. In addition, $i+q_{max}-1=8$, so b=8. The positional gram (1, uni) belongs to category 1, since its starting position is before a=2. Thus it will not be affected due to this deletion. (7, sal) also belongs to category 1, since its end position is after 8, and it will not be affected due to this deletion. Category 2 includes a positional gram, (4, vers), which could be affected by this deletion. Category 3 includes a single positional gram, (3, iv), Since there is a gram ivr in D that has the substring s[3, 4] (which is iv) as a prefix, (3, iv) could be affected due to this deletion. In particular, after deleting the letter e, we could generate a new gram ivr, causing the gram iv to disappear.

In conclusion, the positional grams (3, iv) and (4, vers) can be affected due to this deletion. In fact, the set of positional grams for the new string s0 is: VG(s')={(1, uni), (3, ivr), (5, rs), (6, sal)}. Similarly, we can show that for a deletion on the 6-th character (r) on the original string s, it can only affect the positional gram (4, vers). In particular, (3, iv) cannot be affected since there is no gram in D that has the substring ive as a prefix.

The analysis for a substitution operation is identical to the analysis above. The analysis for an insertion operation is almost the same, except that an insertion happens in a "gap," i.e., the place between two consecutive characters, before the first character, or after the last character. The analysis is valid with small modifications on the conditions to check which positional grams belong to which category.

Consider the reversed-gram trie. For each character (for deletion and substitution) or gap (for insertion), we can easily decide the category of a positional gram using its starting position and gram length. To decide what positional grams in category 3 could be affected due to an operation, we need to check if the gram dictionary has a gram that has a given substring as a prefix. This test can be done efficiently using the trie for the dictionary. However, to decide what positional grams in category 4 could be affected, we need to check, for a given substring, whether the dictionary contains a gram that has this substring as a suffix. To support this test, we reverse each gram in D, and build a trie using these reversed grams. This trie is called a reserved-gram trie, and is also part of the VGRAM index. FIG. 11c shows the reversed-gram trie for the dictionary stored in FIG. 11b.

Turn now to the NAG vectors in FIG. 11d. For each string s in the collection S, we want to know how many grams in VG(s) can be affected by k edit operations. We precompute an upper bound of this number for each possible k value, and store the values (for different k values) in a vector for s, called the vector of number of affected grams ("NAG vector" for short) of string s, denoted by NAG(s). The k-th number in the vector is denoted by NAG(s, k). As we will see below, such upper bounds can be used to improve the performance of existing algorithms.

Ideally we want the values in NAG(s) to be as tight as possible. For an integer k>0, we can compute an upper bound based on the analysis above as follows. For each of its |s| characters and |s|+1 gaps, we calculate the set of positional grams that could be affected due to an edit operation at this position (character or gap). For each character and gap, we calculate its number of potentially affected positional grams. For these 2|s|+1 numbers, we take the k largest numbers, and use their summation as NAG(s, k). FIG. 11d shows the NAG vectors for the strings.

Lemma 1. For a string $s_i$, let $VG(s_i)$ and $NAG(s_i)$ be the corresponding set of variable-length positional grams and NAG vector of $s_i$, respectively. Suppose two strings $s_1$ and $s_2$ have $ed(s_1, s_2) \leq k$. The following is a lower bound on the number of common grams (ignoring positional information) between $VG(s_1)$ and $VG(s_2)$ (using the same gram dictionary).

$$B_{vc}(s_1,s_2,k) = \max(|VG(s_1)| - NAG(s_1,k), |VG(s_2)| - NAG(s_2,k)) \quad (3)$$

The following is an upper bound on the hamming distance between the bit vectors (ignoring positional information) corresponding to $VG(s_1)$ and $VG(s_2)$ (using the same gram dictionary):

$$B_{vh}(s_1,s_2,k) = NAG(s_1,k) + NAG(s_2,k) \quad (4)$$

This lemma shows that we can easily use NAG vectors to compute the similarity of the variable-gram sets of two similar strings.

Turn to the issue of adopting VGRAM technique. We use three existing algorithms in the literature to show how to adopt VGRAM to improve their performance. Let S be a collection of strings. We have built a VGRAM index structure for S, which includes a gram dictionary D stored as a gram-dictionary trie, a reverse-gram trie, and a precomputed NAG vector NAG(s) for each string s in S.

Consider algorithms based on inverted lists. Algorithms such that these could be implemented based on inverted lists of grams. For a string s in S, we generate its set of positional q-grams, for a constant q. For each of them, we insert the string id, together with the position of the gram in the string, to the inverted list of the gram. For an approximate selection query that has a string Q and an edit-distance threshold k, we want to find strings s in S such that $ed(s,Q) \leq k$. To answer the query, we use the q-grams of Q to search in their corresponding inverted lists, and merge these lists to find candidate strings. Several filtering techniques can be used: (1) Length filtering. |s| and |Q| differ by at most k. (2) Position filtering: the positions of each pair of common grams should differ by at most k. (3) Count filtering: the strings should share enough grams, and Equation 1 gives a lower bound of the number of common grams between the two strings. String pairs with a zero or negative count bound need to be processed separately. For those strings that share enough pairs, we remove false positives by checking if their edit distance to Q is not greater than k. This algorithm is called MergeCount in the prior art. An approximate string join of two string collections R and S can be implemented by calling MergeCount for each string in R on the inverted-list index of S. This implementation of approximate-string joins is called ProbeCount in the prior art.

To adopt VGRAM in these algorithms, we only need to make minor changes. (1) Instead of generating fixed-length q-grams, we call the VGEN algorithm to convert a string s to a set of positional variable-length grams VG(s). (2) For two strings $s_1$ and $s_2$, instead of using the value in Equation 1 as a lower bound on the number of common grams, we use the new bound in Equation 3. In the equation, if $s_i$ is in S, then $|VG(s_i)|$ and $NAG(s_i)$ are precomputed in the VGRAM index. If $s_i$ is a string in a query, then $|VG(s_i)|$ and $NAG(s_i)$ are precomputed efficiently using the VGRAM index structure on the fly. The rest of these algorithms remains the same as before. As we will see in the experiments, adopting VGRAM can improve the performance of the algorithms and reduce their inverted-list size as well.

Consider the prior ad algorithm: ProbeCluster. ProbeCluster was created to support efficient set-similarity joins. Given a collection S of sets, this algorithm can find all pairs of sets from S whose number of common elements is at least a predefined threshold. This algorithm can be used to do a self approximate-string join of edit distance k on a collection of strings, after converting each string to a set of fixed-length grams, and treating two string-position pairs as the same element if they use the same gram, and their positions differ by at most k. We use the bound $B_c(s_1, s_2, q, k)$ in Equation 1 as the set-similarity threshold. (The algorithm still works even if different set pairs have different set-similarity thresholds.) When performing a self-join on the same collection of strings, the ProbeCluster algorithm improves the ProbeCount algorithm by using several optimizations. One optimization is that it scans the data only once, and conducts the join while building the inverted lists at the same time. Another optimization is to reduce the size of each inverted list by clustering sets (strings) with many common grams, and storing pointers to these clusters of strings instead of those individual strings. The algorithm constructs the clusters on-the-fly during the scan. For each record, it uses inverted lists of clusters to prune irrelevant clusters, before doing a finer-granularity search of string pairs. To adopt VGRAM in ProbeCluster, we just need to make the same two minor modifications described above: (1) We call VGEN to convert a string to a set of variable-length grams, (2) We use Equation 3 instead of Equation 1 as a set-similarity threshold for the sets of two similar strings.

Consider the prior art algorithm: PartEnum. PartEnum was created to do set-similarity joins. The main idea of the algorithm is the following. Assume there are N elements corresponding to all possible grams. We view a subset of these N elements as a bit vector. If the hamming distance between two bit vectors is not greater than n, then after partitioning each vector to n−1 equisize partitions, the two vectors should agree on at least one partition. The same observation can be extended by considering combinations of these partitions. Based on this idea, for the vector of each set, the algorithm first divides the vector into some partitions. For each partition, the algorithm further generates a set of signatures by using combinations of finer partitions. Using these signatures we can find pairs of bit vectors whose hamming distance is not greater than a given threshold. We can use this algorithm to do approximate-string joins with an edit distance threshold k, since the hamming distance of the bit vectors of the q-gram sets of two strings within edit distance k must be not greater than the upper bound in Equation 2. The dilemma of choosing gram length discussed above also exists for this algorithm. As noticed by the authors, increasing the value of q can result in a larger (thus weaker) threshold in Equation 2. On the other hand, a smaller value of q means that the elements of the algorithm input are drawn from a smaller domain.

To adopt VGRAM in this algorithm, we notice from Equation 4 that different string pairs could have different upper bounds on their gram-based hamming distances. Suppose we want to do an approximate string join between two string collections, R and S, with an edit-distance threshold k. Assume we have a VGRAM index on R. For each string s in S, we compute its VG(s) and NAG(s, k) using the VGRAM index of R. (Such a step can be avoided when we do a self join of R.) Let $B_m(S)$ be the maximal value of these NAG(s, k)'s for different s strings. Similarly, let $B_m(R)$ be the maximal value of the NAG(r, k)'s for different r strings in R, and this value can be easily precalculated when constructing the VGRAM index structure. We can use $B_m(R)+B_m(S)$ as a new (constant) upper bound on the gram-based hamming distance between a string in R and a string in S.

Optimization can be done by utilizing the different hamming-distance bounds for different string pairs. We illustrate an optimization using an example. Assume the NAG(r, k) values of strings r in R are in the range of [1, 12], while the maximal upper bound for S, i.e., $B_m(S)$, is 10. We partition the strings in R into three groups: $R_1$ with NAG(r, k) values in [1, 4], $R_2$ with NAG(r, k) values in [5, 8], and $R_3$ with NAG(r, k) values in [9, 12]. (Other partition schemes are also possible.) For $R_1$ strings, we generate a set of signatures using the hamming-distance bound $4+B_m(S)=14$, while we also generate a set of signatures for S using the same bound 14. We use these signatures to join $R_1$ with S to find similar pairs. Similarly, we join $R_2$ with S by using their signatures based on the hamming-distance bound $8+B_m(S)=18$, we join $R_3$ with S by using their signatures based on the hamming-distance bound $12+B_m(S)=22$. Notice that each of the joins is very efficient since (1) there are fewer R strings, (2) each hamming-distance bound is customized and tighter than the constant bound for the entire collection R, giving the algorithm a better chance to choose better signatures. We could further improve the performance by partitioning S into different groups, and generating different sets of signatures for different groups using different hamming-distance bounds.

In summary, focus on the issue of dynamic maintenance. The VGRAM index structure can be easily maintained for string insertions and deletions. When a new string is inserted, we calculate its NAG vector using the index and store it in the index. Deletion can be processed similarly. If there are a lot of updates on the string collection, and the quality of grams changes too much, we can rebuild the index structure efficiently.

Consider other edit distance variants. The VGRAM technique can be extended slightly to support approximate queries using variants of edit distance. (1) Approximate substring queries: A query asks for strings from a collection that have a substring similar to a given string or a collection of strings. VGRAM can be used to answer such queries based on the observation that if string $s_1$ is similar to a substring of string $s_2$, then $s_1$ and $s_2$ should share enough common grams. (2) Edit distance allowing block moves: A variant of edit distance allows a move of a block of contiguous characters with a constant cost. The extended edit distance between two strings is the minimum cost of operations (insertion, deletion, substitution, all with a unit cost, and block move with a constant cost) needed to transform one string to the other string. VGRAM can be used to answer such queries by analyzing the effect of each move operation on the grams close to the three "gaps" generated by the move. Using VGRAM in DBMS: Several recent studies have developed techniques to support approximate string queries inside a relational DBMS using SQL queries. We can adopt the VGRAM technique in these algorithms inside a DBMS as follows. The trie and the reversed-gram trie can be stored and implemented in an application level on top of the DBMS. For instance, we could implement the VGEN algorithm in FIG. 12 as a user-defined function (UDF) to generate a set of positional grams for a string. The NAG vectors for the strings can be stored as a table inside the DBMS. Utilizing these tables, with a small amount of code at the application level, we can adopt the VGRAM technique inside a DBMS to support approximate queries.

Thus, it can be appreciated that we have developed a novel technique, called VGRAM, to improve performance of approximate string queries. It is based on the idea of choosing variable-length, high-quality grams, which can be used to identify similar strings based on their common grams. We gave a full specification of the technique, including its index structure, how to generate grams for a string using the index structure, and the relationship between the similarity of two strings and the similarity of their grams. We showed how to adopt this technique in a variety of existing algorithms. Our extensive experiments on real data sets have shown that the technique can be easily used to improve these algorithms, without substantial modifications of these algorithms.

Since an index structure using fixed-length grams can be viewed as a special case of VGRAM, a fundamental problem arises naturally: what is the relationship between the gram dictionary and the performance of queries? We study this problem in this portion of the disclosure. We propose a dynamic programming algorithm for computing a tight lower bound on the number of common grams shared by two similar strings in order to improve query performance. We analyze how a gram dictionary affects the index structure of the string collection and ultimately the performance of queries. We also propose an algorithm for automatically computing a dictionary of high-quality grams for a workload of queries.

In the foregoing discussion concerning VGRAM we judiciously choose a dictionary of high-quality grams of variable lengths from the string collection based on gram frequencies. An important observation is that two similar strings should still share certain number of common grams, and the new lower bound can be computed efficiently. At a high level, VGRAM can be viewed as an additional index structure associated with the collection of strings.

The following is an interesting observation: An inverted list index based on grams of fixed-length q can be viewed as a special VGRAM index structure, in which the gram dictionary only includes grams of length q. The choice of the gram dictionary greatly affects the performance of existing algorithms. Based on this observation, several fundamental problems arise naturally: what is the fundamental relationship between the gram dictionary and the performance of queries on the string collection? If this relationship is understood, how to compute a good gram dictionary automatically? In this portion of the disclosure we study these issues, and make the following further disclosures. Since the lower bound on the number of common grams between similar strings affects the performance of algorithms, it is important to make this bound as tight as possible. Below we present a simple way to compute a lower bound. We develop a dynamic programming algorithm that can compute a tighter lower bound. We formally analyze how adding a new gram to an existing gram dictionary can affect the index structure of the string collection, thus the performance of queries. We will show that these analyses are technically very challenging and interesting. We develop an efficient algorithm that can automatically find a high-quality gram dictionary for the string collection.

Above we developed a heuristic-based algorithm for generating a gram dictionary, which requires several manually-tuned parameters. The algorithm discussed below does not require some of the parameters, and is cost-based. This study is the first cost-based quantitative approach to deciding good grams for approximate string queries. We have conducted experiments on real data sets to evaluate the proposed techniques, and show that they can indeed generate good gram dictionaries to improve performance of existing algorithms Consider the possibility of tightening lower bounds on number of common grams. A lower bound on the number of common grams shared by two similar strings affects the performance of a query in two ways. First, it affects how efficiently we can access the inverted lists of the grams in the query. Second, it decides how many strings become candidate answers to the query after accessing these lists. Therefore, it is critical to make this lower bound as tight as possible. Above we gave a simple way to compute this lower bound in the VGRAM technique. Now we develop a dynamic programming algorithm for computing a tighter lower bound.

First, consider the effect of edit operations on grams. Let D be a gram dictionary in VGRAM, using which we decompose strings to grams. We first see how edit operations on a string s affect its grams in VG(s,D). Consider the i-th character s[i]. If there is a deletion operation on this character, we want to know how many grams in VG(s,D) could be affected by this deletion, i.e., they may no longer be generated from the new string after this deletion operation. Above we showed how to efficiently compute an upper bound on this number by using two tries of the grams in the dictionary D. Let B[i] be the computed upper bound. For simplicity, deletions and substitutions on this character and insertions immediately before and after this character are all called "edit operations at the i-th positions." The following proposition shows that this B[i] value is indeed an upper bound on the number of destroyed grams due to all possible edit operations at this position.

Proposition 3.1. Let string s' be obtained by doing edit operations at the i-th position of a string s. The number of grams in VG(s,D) that will no longer exist in VG(s', D) is at most B[i].

We call <B[1], B[2], . . . , B[|s|]> the Position-Gram-Bound Vector (or "PGB Vector") of the string s. For example, consider a string "binding" and the gram dictionary shown in FIG. 3(a). The grams generated from this string are shown in FIG. 17a, which also shows the PGB vector for the string. For instances the value 3 on the character d means that any number of edit operations at this position can destroy at most 3 grams of this string. FIG. 17b shows the grams that could be affected by edit operations at each position.

Focus now on tightening lower bounds using dynamic programming. From this PGB vector, we can compute a "number-of-affected-gram vectors" ("NAG vector" for short) for the string. The k-th value in this vector, denoted by NAG(s, k, D) (or just NAG(s, k) when the dictionary D is clear from the context), indicates that if there are k edit operations on this string, then there are at most this number of grams that will no longer exist after these edit operations. It has been shown in above that if two strings satisfy $ed(s_1, s_2) \leq k$, then they should share at least the following number of grams $$\mathrm{Max}\{|VG(s_1)|-\mathrm{NAG}(s_1,k), |VG(s_2)|-\mathrm{NAG}(s_2,k)\} \quad (3')$$

In particular, for a given query σ(Q, k), the following is a lower bound on the number of common grams between a string s and Q when $ed(s,Q) \leq k$ $$B(Q,k)=|VG(Q)|-\mathrm{NAG}(Q,k) \quad (4')$$

When answering a query, we often use the bound in Equation 4' mainly because it is only dependent upon the query, not a string in the collection. For each candidate string satisfying this bound, we could further do some pruning using the possibly tighter bound in Equation 3'.

Based on this analysis, the values in NAG vectors affect the lower bound on the number of common grams between similar strings, and ideally we want these bounds to be as tight as possible. One way to compute the NAG(s, k) value, as proposed above, is to take the summation of the k largest values in the PGB vector of string s. We call it the "k-max algorithm." For example, consider the query string "binding" in FIG. 17a. Assume k=2. To compute NAG("biinding",2), we could take the summation of the 2 largest values in the PGB vector, which is 3+3=6. The bound given by this pessimistic approach could be loose, since in some cases, those largest numbers might represent overlapping grams. In the running example, the two positions (3 and 5) with the largest bound value are close to each other. FIG. 17b shows that for the edit operations on these two positions, their sets of affected grams overlap, and both share the gram in. The total number of affected grams is 5 (instead of 6), which are bi, ii, in, nd, and di. In fact, a tighter value for NAG("biinding", 2) is 5. We develop a dynamic programming algorithm for computing tighter-bound values for the NAG vector.

We create subproblems as follows. Let $0 \leq i \leq k$ and $0 \leq j \leq |s|$ be two integers. Let $P(i, j)$ be an upper bound on the number of grams in VG(s,D) that can be affected by i edit operations that are at a position no greater than j. Our final goal is to compute a value for $P(k, |s|)$.

Initialization: For each $0 \leq i \leq k$, we have $P(i, 0)=0$. For each $0 \leq j \leq |s|$, we have $P(0, j)=0$.

Recurrence Function: Consider the subproblem of computing a value for the entry $P(i, j)$, where $i>0$ and $j>0$. We have two options.

Option (1): We do not have an edit operation at position j. In this cases we can set $P(i, j)$ to be $P(i, j-1)$, since all the j edit operations occur before or at position j−1.

Option (2): We have (possibly multiple) edit operations at position j. These operations could affect at most B[j] grams of s, where B[j] is the j-th value in the PGB vector of this string. For all the grams of s that start from a position before j that cannot be affected by these edit operations at the j-th position, let R(j) be their largest starting position. (This number can be easily computed when we compute the PGB vector for this string.) Therefore, P(i, j) can be set as the summation of P(i−1,R(j)) and B[j], assuming in the worst case we have i−1 edit operations on positions before or at j.

For these two cases, we can assign their maximal value to the entry $P(i, j)$. The following formula summarizes the recurrence functions:

$$P(i,j) = \max\{P(i,j-1), (\text{no operation at } j) \text{ or } P(i-1,R(j)) + B[j].(\text{operations at } j)$$

Figures 18, 19:
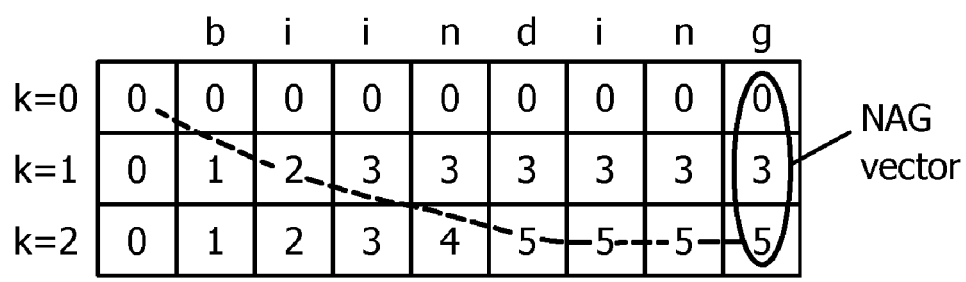
FIG. 18 is a table showing a use dictionary $D_1$.
FIG. 19 is a table showing a matrix which illustrates dynamic programming of the NAG vector.

Using the analysis above, we can initialize a matrix of size $(k+1) \times (|s|+1)$. We set the values in the first row and the first column to be 0. We use the recurrence function to compute the value of each entry, starting from the top-left entry, until we reach the right-bottom entry. The rightmost column will give us an NAG vector for the string. For examples consider the query s=biinding and the gram dictionary shown in FIG. 18. FIG. 19 shows the matrix to calculate an NAG vector for this string. The dotted line shows the steps to compute the value at the right-bottom entry. The last column gives us an NAG vector, which is <0, 3, 5>.

Consider further the effect on adding a gram to a dictionary. To build a high quality gram dictionary for a string collection S to answer approximate queries on S efficiently, we need to understand the fundamental relationship between the gram dictionary and query performance. In this section, we study the following problem: how does the addition of a new gram g to an existing gram dictionary D of S affect the index structure of S, thus affect the performance of queries using the index? At a high level, the new gram will have the following effects. (1) The inverted-list index structure of S will have one more inverted list for this gram g, which will "suck" some string IDs from the inverted lists of some grams related to g. For instance, if g=abc, then the new list of g will take some string IDs from the list of the gram ab and some from the list of the gram bc. (2) For an approximate string query, it could generate a different set of grams, and their corresponding inverted lists could become shorter. In addition, the new gram can also affect the NAG vector for the query string. Thus it could result in a different set of candidate strings for the query using the possibly new lower bound on the number of common grams between similar strings. Next we will analyze the details of these effects.

We first study how adding a gram affects the inverted lists on S. We introduce the following concepts.

Definition 1. Let $g_i$ be a gram in D. The complete list of $g_i$, denoted by $C(g_i)$, includes all the IDs of the strings in S that include this gram. The local list of $g_i$ with respect to a gram dictionary D, denoted by $L(g_i,D)$, includes all the IDs of the strings whose decomposed grams using a gram dictionary D include the gram $g_i$.

The lists shown in earlier figures are all local lists. When using fixed-length grams, the complete and local lists for a gram are always the same. For instance, the lists in a conventional 2-gram dictionary are both the complete and local lists for the corresponding grams. In general, $L(g_i,D)$ is always contained in $C(g_i)$. However, if a string ID appears on the complete list $C(g_i)$, it might not appear on the local list $L(g_i,D)$, since the string might not generate this gram $g_i$ due to the fact that this gram is subsumed by another gram of the string. We will see that these lists can help us analyze the effects of adding a gram to an existing dictionary, and quantify the performance improvement on queries. Thus we want to incrementally maintain these lists after adding a gram. In the rest of this portion of the disclosure, we refer the local list of a gram as "the list of a gram," unless specified otherwise. Notice that the set of complete lists of grams is a temporary index structure used in the process of generating a gram dictionary. After that, the final index structure does not keep these complete lists.

Figure 20A:
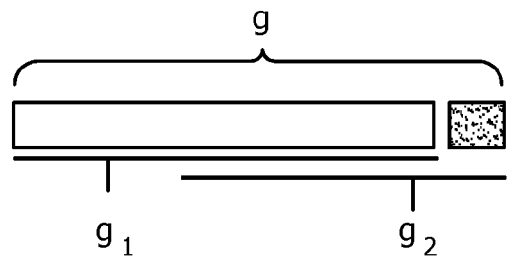
FIGS. 20a and 20b are diagrams showing extension of a gram to a new gram.
Figure 20B:
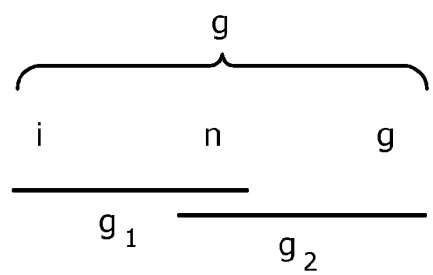

Let $g_1$ be an existing gram in D, and g be a new gram obtained by appending a character to the end of $g_1$. Let $g_2$ be the longest suffix of g that exists in D. FIG. 20a illustrates these grams, and FIG. 20b shows an example, where $g_1$=in, g=ing, and $g_2$=ng. Let the new gram dictionary $D'=D \cup \{g\}$. We next show how to obtain the complete and local lists for this new gram, how the new gram affects the local lists of the existing grams. Notice that complete lists of grams never change, and this new gram g does not affect the local lists of the existing grams except those of $g_1$ and $g_2$.

The complete list C(g) can be obtained by scanning the string IDs on the complete list $C(g_1)$. For each occurrence of a string s in $C(g_1)$, consider the corresponding substring s[i, j]=$g_1$. If the corresponding longer substring s[i, j+1]=g, then we do the following: (1) Add this string id to the complete list of the gram g; (2) Remove this occurrence of string id s from the local list of $g_1$ (if any); and (3) Remove the occurrence of string id s from the local list of $g_2$ (if any). As a result, the local lists of grams $g_1$ and $g_2$ could shrink.

The process of computing the local list L(g,D') is more subtle. Clearly $L(g,D') \subseteq C(g)$. One question is whether we could assign all the IDs in C(g) to L(g,D'). The following example shows that we cannot do this simple assignment in some cases. Consider the example in FIG. 20b, in which we add the new gram g=ing. If the original dictionary had a gram ingo, whose local list has a string bingo, then this string id should not appear on the local list of the new gram ing, because this string will not generate an ing gram using the new dictionary. This example shows that in the worst case, to compute L(g,D'), we might need to access the lists of all grams in dictionary D that have this new gram g as a substring, and identify some string IDs to be removed from the complete list C(g). Clearly this process can be very inefficient. However, the following lemma shows in some cases we do not need this expensive process.

Lemma 1. If the new gram g is a longest gram in the new dictionary D', then $L(g,D')=C(g)$.

This lemma says that if each time we choose a new gram that does not have a longer gram in the original dictionary, then we can safely assign the complete list C(g) to its local list L(g,D'). In the rest of this section, we assume the new gram has this property, and our algorithm below can satisfy this requirement easily by doing a breadth-first traversal of the trie.

Figure 21:
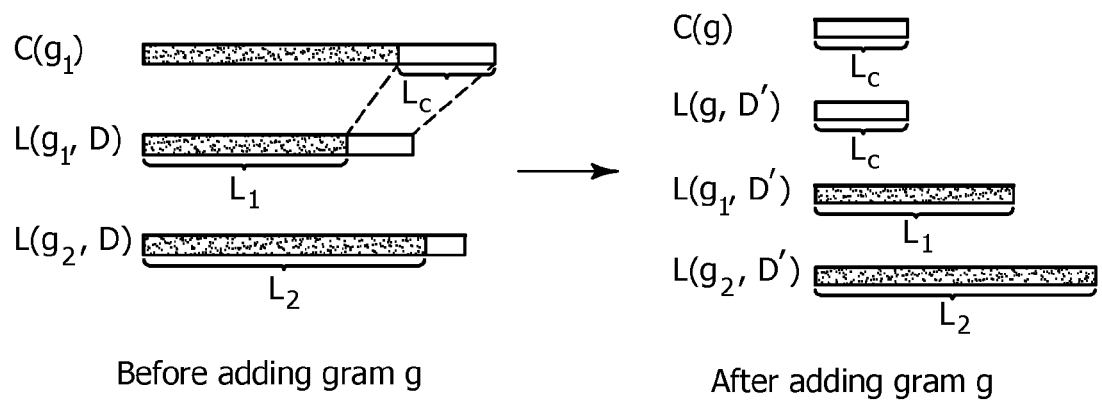
FIG. 21 is a diagram illustrating the changing of inverted lists of grams $g_1$ and $g_2$ after adding a new gram g.

As summarized in FIG. 21, adding g to the existing gram dictionary D will introduce a complete list C(g) and an identical local list L(g,D') for this new gram, which will take some string IDs from the original local lists $L(g_1,D)$ and $L(g_2,D)$ of $g_1$ and $g_2$, respectively. As a result, the total index size (without the complete lists) will decrease. Consider now the effects on lower bounds. Consider a query $\sigma(Q, k)$. Equation 4' above shows a lower bound on the number of common grams between the Query Q query string Q and a string s in the answer. The lower bound is decided by both the number of grams in VG(Q) and the k-th value in the NAG vector, NAG (Q, k). Adding a gram to D could affect both numbers. Although this discussion is based on a query string, the result is also valid for a string in the collection S in general. Consider the strings in FIG. 22a and two queries, $Q_1$=bingon and $Q_2$=bitting, both with an edit-distance threshold 1. Table 1 shows the different effects of adding a new gram to an original dictionary on the two queries.

TABLE 1

| Query Q | Dictionary | Gram set | NAG (Q, 1) | Lower bound | Candidate ids |
|---|---|---|---|---|---|
| bingon | $D_0$ | {bi, in, ng, go, on} | 2 | 3 | 1, 2, 3, 4, 6 |
| | $D_1$ | {bi, ing, go, on} | 2 | 2 | 1, 3, 4, 6 |
| | $D_2$ | {bin, ing, go, on} | 2 | 2 | 1, 6 |
| bitting | $D_0$ | {bi, it, tt, ti, in, ng} | 2 | 4 | 3, 4 |
| | $D_1$ | {bi, it, tt, ti, ing} | 2 | 3 | 3, 4 |
| | $D_2$ | {bi, it, tt, ti, ing} | 3 | 2 | 1, 3, 4 |

What are the effects on VG(Q)? If the query string Q does not include a substring of gram g, clearly adding g to the dictionary will not affect VG(Q). If Q does include a substring of g (possibly multiple times), for each of them Q[i, j]=g, consider the longest suffix gram $g_2$ of g that exists in the original dictionary (FIG. 2b). There are two cases. * If this substring Q[i, j] produces a gram $g_2$ in VG(Q), then this gram will be subsumed by the new gram g using the new dictionary. Thus it will not appear in the new set of grams for Q, causing the size |VG(Q)| to decrease by 1. For example, consider string bingon in Table 1. Using $D_0$, bingon produces five grams. Using $D_1$, which has included one more gram ing, the string produces four grams. The gram in has been replaced by a new gram ing, while ng is no longer produced. * If substring Q[i, j] does not produce a gram $g_2$ using the original dictionary, then this substring will produce the same number of grams in VG(Q) using the new dictionary. For instance, for the string bingon in Table 1, when we add the gram bin to $D_1$ to get $D_2$, the number of grams for the string does not change. To summarize, after adding g to the dictionary, the size |VG (Q)| will either remain the same or decrease.

What are the effects on NAG(Q, k)? Take the string bitting in Table 1 as an example. The addition of the new gram bin to the dictionary $D_1$ causes value NAG(bitting, 1) to increase from 2 to 3. In general, if string Q does not include the gram $g_1$ nor gram $g_2$, then adding the gram g to the dictionary will not affect the NAG vector of Q. Otherwise, g could affect the vector in the following way. It could cause the values of the PGB vector of the string to increase, because an edit operation at a position could destroy more grams. In particular, due to the addition of g, a position in string Q could either overlap with more grams, or an operation at this position could destroy one more gram that cannot be destroyed before adding g. For instance, in the string bingon in our running example, consider its third character n. After adding bin to $D_1$ to get $D_2$, the PGB value at this position changes from 1 to 2. The reason is that this position overlaps with one gram when $D_1$ is used. When we use $D_2$, this position overlaps with two grams. Notice that increasing a value in the PGB vector does not necessarily increase the final NAG values, because the latter are computed using the dynamic programming algorithm presented above.

Table 2 summarizes the effect of a substring Q[i, j] on the lower bound of the query string after the new gram g is added to the dictionary. Take case 2 as an example. It shows that if the substring includes one of $g_1$ and $g_2$, but not g, then after the gram g is added to the dictionary, this substring will cause the lower bound of Q either unchanged, or to decrease by 1.

TABLE 2

| Case | Condition on Q[I, j] | Lower Bound | Candidates satisfying lower bound |
|---|---|---|---|
| 1 | No $g_1$ and no $g_2$ | No change | No change |
| 2 | One of $g_1$ and $g_2$ | No change or −1 | No change, yes→no, or no→yes |
| 3 | G | No change or −1 | No change or yes→not |
| 4 | $g_1$ and $g_2$, but no g | No change or −1 or −2 | No change, yes→no, or no→yes |

Consider the effects on candidates. The above analysis has shown that, after adding the gram g to D, the local inverted lists of the data collection can change, the query string Q could generate a new set of grams, and the lower bound |VG(Q)|−NAG(Q, k) could decrease. As a consequence, the set of candidates satisfying the new lower bound can also change. Table 2 also summarizes the effects of a substring Q[i, j] on string candidates after the gram g is added. For case (1), the substring does not include the gram $g_1$, nor gram $g_2$. Thus this addition of g will not affect the candidates for the query (represented as "No change" in the table). For case (2), the substring includes only one of the grams $g_1$ and $g_2$, but not g. The set of grams for this string will not change, i.e., VG(Q, D)=VG(Q,D'). As shown in FIG. 21, the corresponding local inverted list of $g_1$ or $g_2$ will change. For those string IDs on this list that are not moved to the local list of the new gram, as represented as $L_1$ or $L_2$ in the figure, if the lower bound does not change, then whether these string IDs are candidates for the query or not will not be affected by this new gram (represented as "No change" in the table). If the bound has decreased by 1, then some of the string IDs on this list, which are not candidates before, could become candidates, as represented as "No→Yes" in Table 2. This case is "bad" since more string IDs need to be post processed. For those string IDs that are moved to the local list of g, represented as $L_c$ in the figure, if the lower bound does not change, some of them that are candidates before adding g might no longer be candidates after adding g, represented as "Yes→No" in the table. This case is good since more false positives have been pruned. If the bound decreases by 1 then some of them who are not candidates before can become candidates, indicated by "No→Yes". Similar analyses can be done for the other two cases.

Turn now and consider the algorithm for generating a gram dictionary. We develop an algorithm for automatically generating a high-quality gram dictionary D for a string collection S to support queries on S. From the discussion above we can see that adding a gram to an existing dictionary can have different effects on the performance of different queries. Therefore, choosing a good gram dictionary has to be cost based, and it depends on a given workload of queries. We thus assume we are given a set of queries $W=\{\sigma(Q_1, k_1), \ldots, \sigma(Q_n, k_m)\}$ on the string collection S, and we want to generate a gram dictionary to optimize the overall performance of these queries, measured by their average query time.

An algorithm overview is as follows. FIG. 23 formally describes the algorithm. Its main idea is the following. We first sample some strings from S to get a new collection S' to be used to generate inverted lists for the grams (line 1). The reason to do sampling is to reduce the space requirement by the algorithm and the estimation time for each new possible gram to add.

In each iteration, we store the current gram dictionary as a trie, in which all the paths starting from the root of length at least $q_{min}$ correspond to the grams in the dictionary. In order to efficiently maintain these lists incrementally after each new gram is added (line 16), we want to minimize the number of lists that need to be updated. Lemma 1 above shows that if each new gram has the longest length among the existing grams, we only need to update the lists of two existing grams using the procedure discussed above (line 17). For this reason, we do a breadth-first traversal of the trie to add grams, and grow the grams level by-level. This traversal is implemented by using two queues: the queue Q includes the leaf nodes of the current level, and the queue Qnew includes the leaf nodes of the next level to be further considered (lines 5, 6, 7, 16, and 20).

In the algorithm we maintain both the complete list and local list of string IDs for each gram, which have several advantages. (1) They can help us select an extended gram (line 11). (2) They can be used to estimate the performance improvement (if any) by adding an extended gram to the dictionary (line 15). (3) If the sampled strings include all the strings in S, then after the algorithm terminates, we will already obtain the (local) inverted lists of grams for the final dictionary, thus we do not need another scan of the data set to generate the inverted-list index structure. Notice that after we finish processing all the extended grams for a node n, we can safely remove the complete list of n to save space, since this complete list is no longer needed (line 19). There are different orders to visit the current leaf nodes to identify grams to extend. We can use three orders. (1) SmallFirst: Choose a child with the shortest local list; (2) LargeFirst: Choose a child with the longest local list; (3) Random: Randomly select a child. We implement such an order in line 8. In line 11, we need to find possible extended grams for an existing gram at node n as follows. For each string s on the complete list of n, consider the substring s[i, j] corresponding to the gram of n. If the string has a substring s[i, j+1], we add a child of node n with the character s[j], if this child is not present.

EXAMPLE 1

Figure 24A:
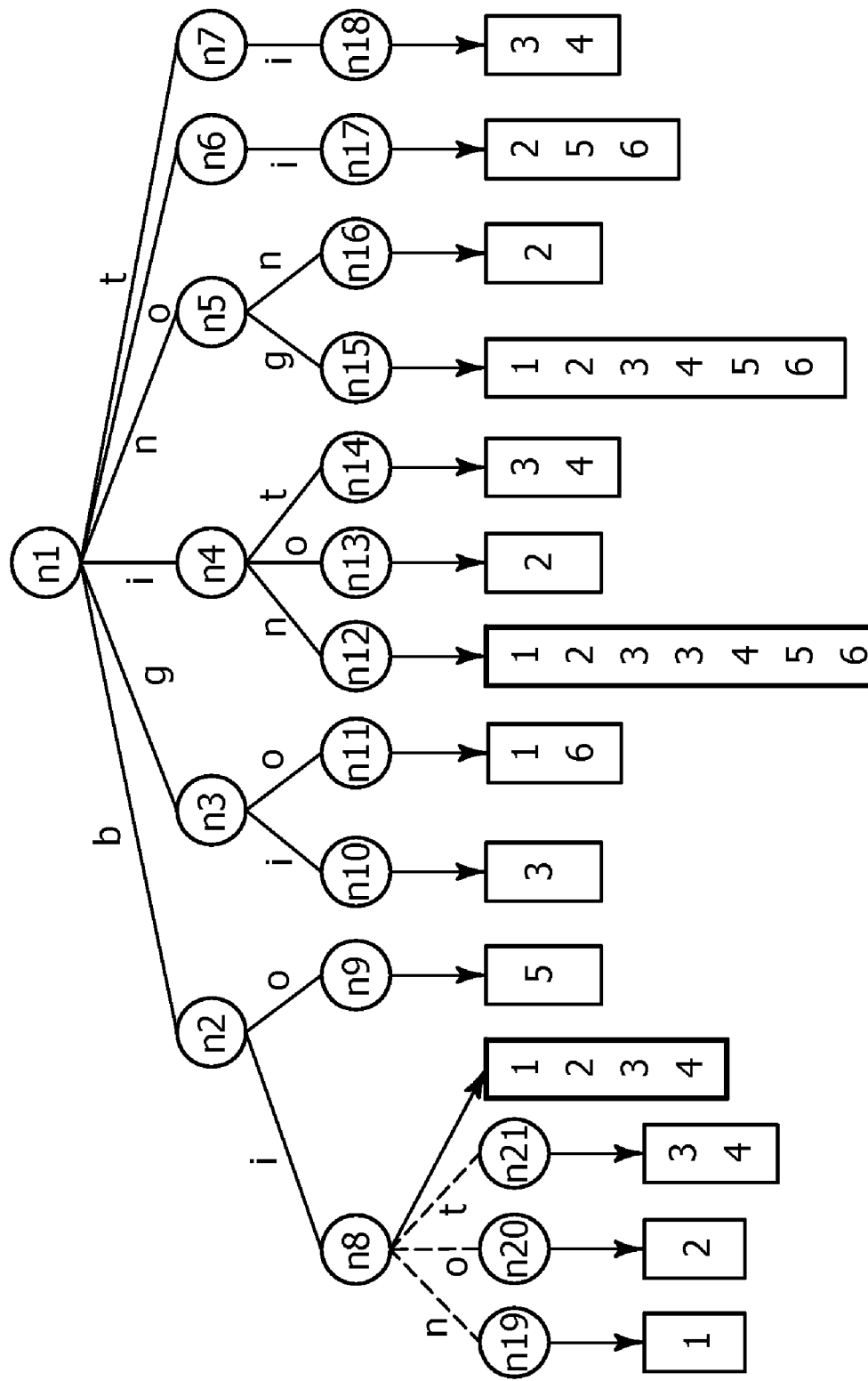

We use FIGS. 24a and 24b to show one iteration in the algorithm. FIG. 24a shows a trie for the six strings in FIG. 22a. For simplicity, we only draw the local lists for the grams. So far we have processed all the grams of length $q_{min}=2$. Now we consider expanding the node n8, which corresponds to the gram bi. We generate its three children corresponding to the extended grams bin, bio, and bit, by scanning the strings on the complete list of bi, which is the same as its local list so far: <1, 2, 3, 4>. For each of the children, we compute their complete and (identical) local lists by scanning the complete list of n8, and identifying the substrings corresponding to this new gram. At this stage, we do not change the local list of n8 yet, since we have not decided whether some of the extended grams will be added. Suppose by running the function Evaluate( ) we decide to add the gram bin to the dictionary. In this case, we modify the local list of node n8 and the local list of gram in (node n12). The new trie is shown in FIG. 24b.

Consider how to estimate the benefits of a gram. A critical step in the algorithm is to decide whether adding a candidate gram g for child node c can improve the overall performance of the query workload (procedure Evaluate in line 15). A naive way to do this evaluation is to run the query workload W using the new gram dictionary after adding g, and compare the performance with that on the original dictionary D. If it does improve the performance, then we add g to the dictionary. Notice that the trie already includes the local lists for the grams, which can be maintained incrementally by modifying just three lists for each potential new gram. Thus re-running the query workload does not require rebuilding the inverted-list index structure. Still this approach could be computationally prohibitive since it needs to rerun the queries for each potential new gram.

In order to do this evaluation efficiently, we can estimate the effect on the query performance by adding the gram g corresponding to the child node c. Recall that the time to answer a query $\sigma(Q, k)$ mainly consists of two parts: the time to access the inverted lists of the generated grams of string Q, and the time to post process the candidates to remove false positives by computing their distances to Q. Based on the analysis above, we know that adding the gram g has several effects on the query performance. Next we will discuss how to estimate these effects quantitatively.

We first estimate how adding the gram g affects the inverted lists. When we expand the node n by adding the children as potential grams, we have already computed the complete list and local list for each child, including g. Thus we know their local lists if g is added. But we do not know the new local lists of nodes n and n' (corresponding to "$g_1$" and "$g_2$" in FIG. 20a respectively) after g is added. The size of each of the two new lists can be estimated by assuming all the string IDs in the new list of g will be removed from the original local lists of n (for $g_1$) and n' (for $g_2$).

The exact amount of time to access the inverted lists of the grams from a query string Q depends on the specific algorithm used for this process. In the literature there are several conventional algorithms for doing this step. Different algorithms have different time complexities in terms of the lengths of these lists. As an illustrative example, we use the conventional HeapMerge algorithm to show how changes on the lists affect the performance of accessing the lists using this merge algorithm. The main idea of this algorithm is to have a cursor on each list, and maintain a heap for the string IDs currently pointed by the cursors on the lists. In each iteration we process the top element (a string id) on the heap, and count the frequency of this id. We add the string id to the set of candidates if its frequency is at least the specified threshold. We move the cursor of this list to the next one, and add its new id back to the heap. We repeat the process until all the IDs on the lists are processed. If h be the number of grams of string Q, and M be the total size of the lists of these grams, then the time complexity of this algorithm is O(M log h).

Now let us see how the changes of the lists affect the performance of accessing the lists when answering the queries in the workload W. For each query $\sigma(Q, k)$, we use the four cases described in Table 2 to discuss how to do the analysis. Let h=|VG(Q,D)|, and M be the total length of the lists of these grams, and H be the average of the h values for all the queries in W.

Case 1: If Q does not have a substring of $g_1$ nor $g_2$, then the time to access the lists of grams of Q does not change after adding g.

Case 2: If Q has only one substring of $g_1$ or $g_2$, then after adding g, the new list-access time can be estimated as; $\alpha((M-|L(g,D\_)|) \log h)$, in which $\alpha$ is a constant to convert list length to running time. (This constant can be easily maintained by running some sample queries.) So the reduced time can be estimated as: $T2=\alpha(|L(g,D\_)| \log H)$.

Case 3: If Q has only one substring of g, then after adding g, the new list-access time can be estimated as $\alpha((M-|L(g_1,D)|-|L(g_2,D)|+|L(g,D')|) \log (h+1))$. So the reduced time can be estimated as $T3=\alpha((|L(g_1, D)|+|L(g_2,D)|-|L(g,D')|) \log H)$.

Case 4; If Q has both $g_1$ and $g_2$, but no g, then after adding g, the new list-access time can be estimated as $\alpha(M-2|L(g,D')| \log (h))$. So the reduced time can be estimated as $T4=\alpha(2|L(g,D')| \log H)$.

These formulas can be adjusted accordingly if Q has multiple substrings satisfying these conditions. One way to estimate the overall effect on the list-access time by the query workload W is to go through the queries one by one, and apply the above formulas for each of them, and compute the summation of their effects. An alternative way, which is more efficient, is the following. We build another trie for the grams from the queries. This trie, denoted by $T_W$, is constructed and maintained incrementally in the same way as the trie for the strings in the collection S during the running of the algorithm GramGen. Using this trie $T_W$, we can compute how many queries are in each of the cases 2-4. Let $p_2$, $p_3$, and $p_4$ be the number of queries in W belonging to cases 2, 3, and 4, respectively. The overall reduction on the list-access time for the queries can be estimated as $p_2 \times T_2 + p_3 * T_3 + p_4 * T_4$.

We use the same methodology to estimate the overall effect of adding gram g on the number of candidates. The main idea is to consider queries in cases 2-4. Using the analysis above, we classify the queries in each case based on the effects of g on their lower bounds and numbers of candidates. We multiply the number of queries and the estimated benefit for each query, and compute the summation of these benefits. There are also prior art techniques which can also be used to do such estimations.

In the literature the term approximate string matching also means the problem of finding within a long text string those substrings that are similar to a given query pattern. In this portion of the disclosure, we use this term to refer to the problem of finding from a collection of strings those similar to a given query string. Many algorithms have been developed for the problem of approximate string joins based on various similarity functions, especially in the context of record linkage. Some of them are proposed in the context of relational DBMS systems. The VGRAM technique has been shown to improve those algorithms based on edit distance. Several prior art studies have mainly focused on approximate selection (or search) queries. In this portion of the disclosure we have mainly focused on selection queries due to its importance to many applications. Although our discussions mainly assumed an index of inverted lists of grams, they are also valid for other similar index structures, since we mainly focused on how the bags of string IDs for grams change when adding a new gram to the dictionary. For example, if we use a hash table to manage these bags, the discussions are still valid after minor changes according to the algorithm.

There are recent studies on the problem of estimating the selectivity of SQL LIKE substring queries, and approximate string queries. Some of the methods in these techniques can be adopted to solve the estimation problems in generating a gram dictionary. Notice that our estimation subproblems are more complicated due to the fact that the overall performance of queries is affected by several factors, such as the lists of grams, the method to compute the lower bound of common grams between similar strings, and the number of candidates satisfying the lower bound. It also depends on the specific algorithm used to access the inverted lists of grams. Another related study proposed a gram selection technique for indexing text data under space constraints. They mainly considered SQL LIKE queries using fixed-length grams. Our work differs from theirs since we focused on approximate string queries using variable-length grams.

In summary in this portion of the disclosure, we studied a fundamental problem in answering approximate queries on a collection of strings in the context of the VGRAM technique: what is the relationship between a predefined gram dictionary and the performance of queries? We proposed a dynamic programming algorithm for computing a tight lower bound on the number of common grams shared by two similar strings in order to improve query performance. We analyzed how adding a gram to an existing dictionary affects the index structure of the string collection, and the performance of queries. We proposed an efficient algorithm for automatically generating a high-quality gram dictionary. Our extensive experiments on real data sets show that these techniques can greatly improve approximate string queries.

Answering approximate queries on string collections is important in applications such as data cleaning, query relaxation, and spell checking where inconsistencies and errors exist in user queries as well as data. Many existing algorithms use gram-based inverted-list indexing structures to answer approximate string queries. These indexing structures are "notoriously" large compared to the size of their original string collection. We disclose how to reduce the size of such an indexing structure to a given amount of space, while retaining efficient query processing. We disclose how to adopt existing inverted-list compression techniques to solve our problem. Then, we disclose two novel approaches for achieving the goal: one is based on discarding gram lists, and one is based on combining correlated lists. They are both orthogonal to existing compression techniques, exploit a unique property of our setting, and offer new opportunities for improving query performance. For each approach we analyze its effect on query performance and develop algorithms for wisely choosing lists to discard or combine. Our experiments on real data sets show that our approaches provide applications the flexibility in deciding the tradeoff between query performance and indexing size, and can outperform existing compression techniques. An interesting and surprising finding is that while we can reduce the index size significantly (up to 60% reduction) with tolerable performance penalties, for 20-40% reductions we can even improve query performance compared to original indexes.

We disclose how to reduce the size of such index structures while still maintaining a high query performance. We disclose how to adopt existing inverted-list compression techniques to our setting. That is, we partition an inverted list into fixed-size segments and compress each segment with a word-aligned integer coding scheme. To support fast random access to the compressed lists, we can use synchronization points at each segment, and cache decompressed segments to improve query performance. Most of these compression techniques were proposed in the context of information retrieval, in which conjunctive keyword queries are prevalent. In order to ensure correctness, lossless compression techniques are usually required in this setting. The setting of approximate string search is unique in that a candidate result needs to occur at least a certain number of times among all the inverted lists, and not necessarily on all the inverted lists.

We exploit this unique property to develop two novel approaches for achieving the goal. The first approach is based on the idea of discarding some of the lists. We study several technical challenges that arise naturally in this approach. One issue is how to compute a new lower bound on the number of common grams (whose lists are not discarded) shared by two similar strings, the formula of which becomes technically interesting. Another question is how to decide lists to discard by considering their effects on query performance. In developing a cost-based algorithm for selecting lists to discard, we need to solve several interesting problems related to estimating the different pieces of time in answering a query. For instance, one of the problems is to estimate the number of candidates that share certain number of common grams with the query. We develop a novel algorithm for efficiently and accurately estimating this number. We also disclose several optimization techniques to improve the performance of this algorithm for selecting lists to discard.

The second approach combines some of the correlated lists. This approach is based on two observations. First, the string IDs on some lists can be correlated. For example, many English words that include the gram "tio" also include the gram "ion". Therefore, we could combine these two lists to save index space. Each of the two grams shares the union list. Notice that we could even combine this union list with another list if there is a strong correlation between them. Second, recent algorithms known in the art can efficiently handle long lists to answer approximate string queries. As a consequence, even if we combine some lists into longer lists, such an algorithm can still achieve a high performance. We study several technical problems in this approach, and analyze the effect of combining lists on a query. Also, we exploit a new opportunity to improve the performance of existing list-merging algorithms. Based on our analysis we develop a cost-based algorithm for finding lists to combine.

We have conducted extensive experiments on real datasets for the list-compression techniques mentioned above. While existing inverted-list compression techniques can achieve compression ratios up to 60%, they considerably increase the average query running time due to the online decompression cost. The two novel approaches are orthogonal to existing inverted-list-compression techniques, and offer unique optimization opportunities for improving query performance.

Note that using our novel approaches we can still compute the exact results for an approximate query without missing any true answers. The experimental results show that (1) the novel techniques can outperform existing compression techniques, and (2) the new techniques provide applications the flexibility in deciding the tradeoff between query performance and indexing size. An interesting and surprising finding is that while we can reduce the index size significantly (up to a 60% reduction) with tolerable performance penalties, for 20-40% reductions, we can even improve the query performance compared to the original index. Our techniques work for commonly used functions such as edit distance, Jaccard, and cosine. We mainly focus on edit distance as an example for simplicity in the present disclosure, but it is to be understood that the disclosed improvement is also intended to be incorporated in any algorithmic function now known or later devised. Additional results and detail are included in the attached appendix.

In the literature the term approximate string query also means the problem of finding within a long text string those substrings that are similar to a given query pattern. In this disclosure, we use this term to refer to the problem of finding from a collection of strings those similar to a given query string. In the field of list compression, many algorithms have previously been developed to compress a list of integers using encoding schemes such as LZW, Huffman codes, and bloom filters. Below we disclose in more detail how to adopt these existing compression techniques to the illustrated improvement. One observation is that these techniques often need to pay a high cost of increasing query time, due to the online decompression operation, while our two new methods could even reduce the query time. In addition, the new approaches and existing techniques can be integrated to further reduce the index size, as verified by our initial experiments.

Many algorithms have been developed for the problem of approximate string joins based on various similarity functions, especially in the context of record linkage. Some of them are proposed in the context of relational DBMS systems. Several recent prior art papers focused on approximate selection (or search) queries. The techniques presented in this disclosure can reduce index sizes, which should also benefit join queries. It has been proposed by some that a gram-selection technique for indexing text data under space constraints, mainly considering SQL LIKE queries. There are recent studies on the problem of estimating the selectivity of SQL LIKE substring queries and approximate string queries.

Recently a technique called VGRAM, was proposed to use variable-length grams to improve approximate-string query performance and reduce the index size. This technique, as it is, can only support edit distance, while the techniques presented in this disclosure support a variety of similarity functions. Our disclosed techniques can also provide the user the flexibility to choose the tradeoff between index size and query performance, which is not provided by VGRAM. Our experiments show that our new techniques can outperform VGRAM, and potentially they can be integrated with VGRAM to further reduce the index size.

Before considering the improvement in the illustrated embodiment, it will be helpful to put into mind some preliminaries. Let S be a collection of strings. An approximate string search query includes a string s and a threshold k. It asks for all r included in S such that the distance between r and s is within the threshold k. Various distance functions can be used, such as edit distance, Jaccard similarity and cosine similarity. Take edit distance as an example. Formally, the edit distance (a.k.a. Levenshtein distance) between two strings $s_1$ and $s_2$ is the minimum number of edit operations of single characters that are needed to transform $s_1$ to $s_2$. Edit operations include insertion, deletion and substitution. We denote the edit distance between two strings $s_1$ and $s_2$ as $ed(s_1, s_2)$. For example, ed("Levenshtein", "Levnshtain")=2. Using this function, an approximate string search with a query string q and threshold k is finding all s included in S such that $ed(s, q) \leq k$.

Let $\Sigma$ be an alphabet. For a string s of the characters in $\Sigma$, we use "|s|" to denote the length of s. We introduce two characters $\alpha$ and $\beta$ not in $\Sigma$. Given a string s and a positive integer q, we extend s to a new string s' by prefixing q−1 copies of $\alpha$ and suffixing q−1 copies of $\beta$. The results extend naturally to the case where we do not extend a string to produce grams. A positional q-gram of s is a pair (i, g), where g is the substring of length q starting at the i-th character of s'. The set of positional q-grams of s, is denoted by G(s, q), or simply G(s) when the q value is clear in the context, and is obtained by sliding a window of length q over the characters of s'. For instance, suppose α=#, β=$, q=3, and s=irvine. We have: G(s, q)={(1, ##i), (2, #ir), (3, irv), (4, rvi), (5, vin), (6, ine), (7, ne$), (8, e$$)}. The number of positional q-grams of the string s is |s|+q−1. For simplicity, in our notations we omit positional information, which is assumed implicitly to be attached to each gram.

We construct an index as follows. For each gram g of the strings in S, we have a list $l_g$ of the IDs of the strings that include this gram (possibly with the corresponding positional information). It is has been observed that an approximate query with a string s can be answered by solving the following generalized problem:

a. T-occurrence Problem: Find the string IDs that appear at least T times on the inverted lists of the grams in G(s, q), where T is a constant related to the similarity function, the threshold in the query, and the gram length q.

Take edit distance as an example. For a string r included in S that satisfies the condition ed(r, s)≦k, it should share at least the following number of q-grams with s:

$$T_{ed} = (|s|+q-1) - k \times q. \qquad (1)$$

Several preexisting algorithms are proposed for answering approximate string queries efficiently. They first solve the T-occurrence problem to get a set of string candidates, and then check their real distance to the query string to remove false positives. Note that if the threshold T≦0, then the entire data collection needs to be scanned to compute the results. We call this situation a panic case. One way to reduce this scan time is to apply filtering techniques. To summarizes the following are the pieces of time needed to answer a query:

If the lower bound T (called "merging threshold") is positive, the time includes the time to traverse the lists of the query grams to find candidates (called "merging time") and the time to remove the false positives (called "post-processing time").

If the lower bound T is zero or negative, we need to spend the time (called "scan time") to scan the entire data set, possibly using filtering techniques.

Below we adopt existing techniques and disclose new techniques to reduce this index size. For simplicity we mainly focus on the edit distance function, and the results are extended for other functions as well, but again it must expressly be understood that many other functions may be substituted for the edit distance function.

Consider now the combination of the invention with a compression techniques. There are many techniques available for list compression, which mainly address the problem of representing integers on inverted lists efficiently to save storage space. In this section we disclose how to adopt these techniques to solve our problem and discuss their limitations. Most of these techniques exploit the fact that IDs on an inverted list are monotonically increasing integers. For example, suppose we have a list $l=(ID_1, ID_2, \ldots, ID_n)$, $ID_i < ID_{i+1}$ for 1<i<n. If we take the differences of adjacent integers to construct a new list $l'=(ID_1, ID_2-ID_1, ID_3-ID_2, \ldots, ID_n-ID_{n-1})$ (called the gapped list of l), the new integers tend to be smaller than the original IDs. Many integer-compression techniques such as gamma codes, delta codes, and Golomb codes can efficiently encode the gapped lists by using shorter representations for small integers. As an example, we disclose here how to adopt one of the recent techniques called Carryover-12.

An issue arises when using the encoded, gapped representation of a list. Many efficient list-merging algorithms in our setting rely heavily on binary search on the inverted lists. Since decoding is usually achieved in a sequential way, a sequential scan on the list might not be affected too much. However, random accesses could become expensive. Even if the compression technique allows us to decode the desired integer directly, the gapped representation still requires restoring of all preceding integers. This problem can be solved by segmenting the list and introducing synchronization points. Each segment is associated with a synchronization point. Decoding can start from any synchronization point, so that only one segment needs to be decompressed in order to read a specific integer. We can make each segment contain the same number of integers. Since different encoded segments could have different sizes, we can index the starting offset of each encoded segment, so that they can be quickly located and decompressed. FIG. 2 illustrates the idea of segmenting inverted lists and indexing compressed segments.

One way to access elements is by decoding the corresponding segment for each random access. If multiple integers within the same segment are requested, the segment might be decompressed multiple times. The repeated efforts can be alleviated using caching. We allocate a global cache pool for all inverted lists. Once a segment is decoded, it will remain in the cache for a while. All integer accesses to that segment will be answered using the cache without decoding the segment.

Most of these existing techniques were initially designed for compressing disk-based inverted indexes. Using a compressed representation, we can not only save disk space, but also decrease the number of disk I/Os. Even with the decompression overhead, these techniques can still improve query performance since disk I/Os are usually the major cost. When the inverted lists are in memory, these techniques require additional decompression operations, compared to noncompressed indexes. Thus, the query performance can only decrease. These approaches have limited flexibility in trading query performance with space savings.

Next we propose two novel methods that do not have these foregoing limitations. In this section we disclose how to reduce the size of an inverted-list index by discarding some of its lists. That is, for all the grams from the strings in S, we only keep inverted lists for some of the grams, while we do not store those of the other grams. A gram whose inverted list has been discarded is called a hole gram, and the corresponding discarded list is called its hole list. Notice that a hole gram is different from a gram that has an empty inverted list. The former means the IDs of the strings with this gram are not stored in the index, while the latter means no string in the data set has this gram. We shall show the effect of hole grams on query answering. Below we analyze how they affect the merging threshold, the list merging and post-processing, and discuss how the new running time of a single query can be estimated. Based on our analysis, we propose an algorithm to wisely choose grams to discard in the presence of space constraints, while retaining efficient processing. We disclose various optimization techniques to improve the performance.

Consider the effects of hole grams on a query. Focus first on the merging threshold. Consider a string r in collection S such that ed(r, s)≦k. For the case without hole grams, r needs to share at least T=(|s|+q−1)−k×q common grams in G(s) (see Equation 1 above). To find such an r, in the corresponding T-occurrence problem, we need to find string IDs that appear on at least T lists of the grams in G(s). If G(s) does have hole grams, the ID of r could have appeared on some of the hole lists. But we do not know on how many hole lists r could appear, since these lists have been discarded. We can only rely on the lists of those nonhole grams to find candidates. Thus the problem becomes deciding a lower bound on the number of occurrences of string r on the nonhole gram lists.

One simple way to compute a new lower bound is the following. Let H be the number of hole grams in G(s), where |G(s)|=|s|+q−1. Thus, the number of nonhole grams for s is $|G(s)|-H$. In the worst case, every edit operation can destroy at most q nonhole grams, and k edit operations could destroy at most k×q nonhole grams of s. Therefore, r should share at least the following number of nonhole grams with s:

$$T'=|G(s)|-H-k\times q. \qquad (2)$$

Figure 3:
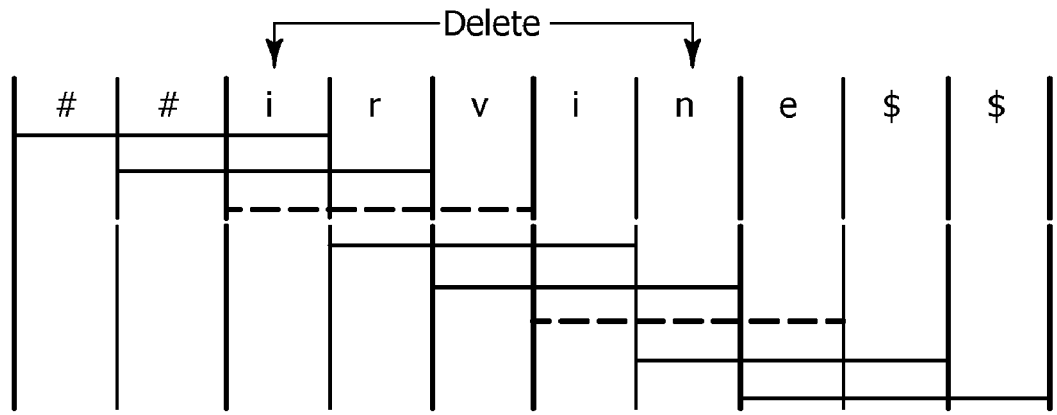
FIG. 3 is a simplified diagram illustrating a query string "Irvine" with two hole grams. A solid horizontal line denotes a nonhole gram, and a dashed line denotes a hole gram. The arrows denote character deletions.

We can use this new lower bound T' in the T-occurrence problem to find all strings that appear at least T' times on the nonhole gram lists as candidates. The following example shows that this simple way to compute a new lower bound is pessimistic, and the real lower bound could be tighter. Consider a query string s=irvine with an edit-distance threshold k=2. Suppose q=3. Thus the total number of grams in G(s) is 8. There are two hole grams irv and ine as shown in FIG. 3. Using the formula above, an answer string should share at least 0 nonhole grams with string s, meaning the query can only be answered by a scan. This formula assumes that a single edit operation could potentially destroy 3 grams, and two operations could potentially destroy 6 grams. However, a closer look at the positions of the hole grams tells us that a single edit operation can destroy at most 2 nonhole grams, and two operations can destroy at most 4 nonhole grams. FIG. 3 shows two deletion operations that can destroy the largest number of nonhole grams, namely 4. Thus, a tighter lower bound is 2 and we can avoid the panic case. This example shows that we can exploit the positions of hole grams in the query string to compute a tighter threshold. We develop a dynamic programming algorithm to compute a tight lower bound on the number of common nonhole grams in G(s) an answer string needs to share with the query string s with an edit-distance threshold k (a similar idea is also adopted in an algorithm in the context of the VGRAM technique).

Our experiments have shown that this algorithm can increase query FIG. 3. A query string irvine with two hole grams. A solid horizontal line denotes a nonhole gram, and a dashed line denotes a hole gram. The arrows denote character deletions, performance by tightening the bound.

A dynamic programming algorithm to compute a tight lower bound on the number of common nonhole grams in G(s) an answer string FIG. 3 needs to share with the query string s with an edit-distance threshold k, similar to the idea in the context of the VGRAM technique above.

Consider first a subproblem. Let $0 \leq i \leq |s|$ and $1 \leq j \leq k$ be two integers. Let P(i, j) be an upper bound on the number of grams that can be destroyed by j edit operations that are at positions no greater than i. The overall problem we wish to solve becomes P(|s|, k).

Starting with initialization, let $D^{d/s}_i$ denote the maximum possible number of grams destroyed by a deletion or substitution operation at position i, and let $D^{ins}_i$ denote the maximum possible number of grams destroyed by an insertion operation after position i. For each $0 \leq i \leq |s|$ we set $P(i, 0) = \max(D^{d/s}_i, D^{ins}_i)$.

The solution is provided by a recurrence function. Consider the subproblem of computing a value for entry P(i, j). Let $g_i$ denote the gram starting from position i, which may either be a hole or a nonhole gram. If it is a hole, then we can set P(i, j)=P(i−1, j) because an edit operation at this position cannot be the most destructive one. Recall that we have already discarded the list belonging to the gram at i. If the gram starting from i is not a hole then we need to distinguish three cases.

We have a deletion/substitution operation at position i. This will destroy grams up to position i−q+1 and consume one edit operation. The number of grams destroyed is $D^{d/s}_i$. Therefore, we can set $P(i, j)=P(i-q, j-1)+D^{d/s}_i$.

We have an insertion operation after position i. This will destroy grams up to position i−q+2 and consume one edit operation. The number of grams destroyed is $D^{ins}_i$. Therefore, we can set $P(i, j)=P(i-q+1, j-1)+Dins_i$.

There is no operation at i. We can set P(i, j)=P(i−1, j).

The following is a summary of the recurrence function:

$$P(i, j) = \max \begin{cases} g_i \text{ is a hole: } P(i-1, j) \\ g_i \text{ is a gram: } \begin{cases} \text{delete/substitute } i: \\ P(i-q, j-1) + D^{d/s}_i \\ \text{insertion after } i: \\ P(i-q+1, j-1) + D^{ins}_i \\ \text{noop } i: \\ P(i-1, j) \end{cases} \end{cases}$$

After we have computed the maximum number of grams destroyed by k edit operations (denoted by $D_{max}$), we can get the new bound using the same idea as in Equation 1', except that the maximum number of grams destroyed is not k×q but $D_{max}$.

Focus now on list-merging time. The running time of some merging algorithms (e.g. HeapMerge, ScanCount) is insensitive to the merging threshold T and mainly depends on the total number of elements in all inverted lists. Therefore, their running time can only decrease by discarding some lists. Other merging algorithms (e.g., MergeOpt, DivlDeSkip) separate the inverted lists into a group of long lists and a group of short lists, and process them separately. The performance of these algorithms depends on how the two groups are formed, which is related to T. Thus their performance is sensitive to changes in T. Another class of algorithms such MergeSkip and DivlDeSkip utilize T to skip irrelevant elements on the lists. Decreasing T by discarding some lists might negatively affect their performance. Meanwhile, we might have fewer lists to process, possibly resulting in an improvement of the query performance.

Focus on post-processing time. For a given query, introducing hole grams may only increase the number of candidates to post-process if we use Equation 2. Surprisingly, if we use the dynamic programming algorithm to derive a tighter T', then the number of candidates for post-processing might even decrease. Take the example given in FIG. 3. Suppose the edit-distance threshold k=2. Say that some string ID i only appears on the inverted lists of irv and ine. Since T=2, it is a candidate result. If we choose to discard the grams irv and ine as shown in FIG. 3, as discussed earlier, the new threshold T'=2. After discarding the lists, the string i is not a candidate anymore, since all the lists containing it have been discarded. Thus we can reduce the post-processing cost. Note that any string ID which appears only on irv and ine cannot be an answer to the query and would have been removed from the results during post-processing.

Focus now on estimating time effects on a query. Since we are evaluating whether it is a wise choice to discard a specific list $l_i$, we want to know, by discarding list $l_i$, how the performance of a single query Q will be affected using the indexing structure. We now quantify these effects discussed above by estimating the running time of a query with hole grams. In the appendix we discuss how to estimate the merging time and scan time. We focus on estimating the post-processing time.

For each candidate from the T-occurrence problem, we need to compute the corresponding distance to the query to remove the false positives. This time can be estimated as the number of candidates multiplied by the average edit-distance time. Therefore, the main problem becomes how to estimate the number of candidates after solving the T-occurrence problem. This problem has been studied in the literature recently. While these prior art techniques could be used in our context, they have two limitations. First, their estimation is not 100% accurate, and an inaccurate result could greatly affect the accuracy of the estimated post-processing time, thus affecting the quality of the selected nonhole lists. Second, this estimation may need to be done repeatedly when choosing lists to discard, and therefore needs to be very efficient.

Figure 4:
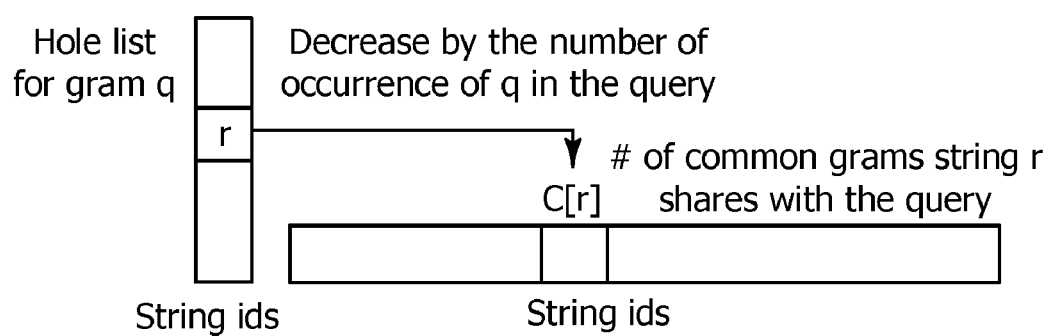
FIG. 4 is a diagram illustrating the intuitive ideas behind the Incremental-Scan-Count (ISC) algorithm.

We disclose an efficient, incremental algorithm that can compute a very accurate number of candidates for query Q if list $l_i$ is discarded. The algorithm is called ISC, which stands for "Incremental-Scan-Count." ISC can be compared to a prior art algorithm called ScanCount described in C. Li, J. Lu, and Y. Lu. Efficient merging and filtering algorithms for approximate string searches. In *ICDE*, pages 257-266, 2008. Although ScanCount is not the most efficient one for the T-occurrence problem, it has the nice property that it can be run incrementally. FIG. 4 shows the intuition behind the ISC algorithm. First, we analyze the query Q on the original indexing structure without any lists discarded. For each string ID in the collection, we remember how many times it occurs on all the inverted lists of the grams in the query and store them in an array C. Now we want to know if a list is discarded, how it affects the number of occurrences of each string ID. For each string ID r on list l belonging to gram g to be discarded, we decrease the corresponding value C[r] in the array by the number of occurrences of g in the query string, since this string r will no longer have g as a nonhole gram. After discarding this list for gram g, we first compute the new merging threshold T'. We find the new candidates by scanning the array C and recording those positions (corresponding to string IDs) whose value is at least T'.

Figure 5:
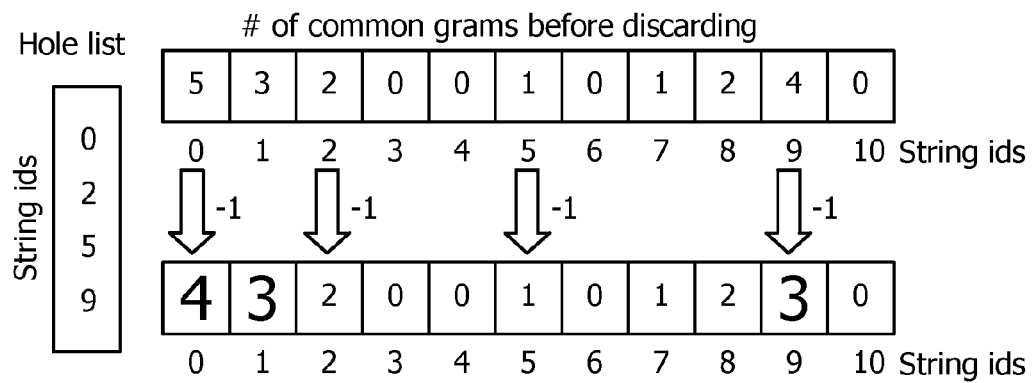
FIG. 5 is a diagram illustrating the operation of the ISC algorithm of FIG. 4.

For instance, in FIG. 5, the hole list includes string IDs 0, 2, 5, and 9. For each of them, we decrease the corresponding value in the array by 1 (assuming the hole gram occurs once in the query). Suppose the new threshold T' is 3. We scan the new array to find those string IDs whose occurrence among all non-hole lists is at least 3. These strings, which are 0, 1, and 9 (in bold face in the figure), are candidates for the query using the new threshold after this list is discarded.

Consider now the choosing of inverted-lists to discard. We now disclose how to wisely choose lists to discard in order to satisfy a given space constraint. The following are several simple approaches: choosing the longest lists to discard (LongList), choosing the shortest lists to discard (ShortList), or choosing random lists to discard (RandomList). These naive approaches blindly discard lists without considering the effects on query performance. Clearly, a good choice of lists to discard depends on the query workload. Based on our previous analysis, we present a cost-based algorithm called DiscardLists, as shown in FIG. 6. Given the initial set of inverted lists, the algorithm iteratively selects lists to discard, based on the size of a list and its effect on the average query performance for a query workload Q if it is discarded. The algorithm keeps selecting lists to discard until the total size of the remaining lists meets the given space constraint (line 2).

In each iteration (lines 3-8), the algorithm needs to evaluate the quality of each remaining list $l_i$, based on the expected effect of discarding this list. The effect includes the reduction $\Delta^i_{size}$ on the total index size, which is the length of this list. It also includes the change $\Delta^i_{time}$ on the average query time for the workload Q after discarding this list. (Surprisingly, $\Delta^i_{time}$ can be both positive and negative, since in some cases discarding lists can even reduce the average running time for the queries.) In each iteration (line 6), we need to use the $\Delta^i_{size}$'s and $\Delta^i_{time}$'s of the lists to decide what lists should be really discarded. There are many different ways to make this decision. One way is to choose a list with the smallest $\Delta^i_{time}$ value (notice that it could be negative). Another way is to choose a list with the smallest $\Delta^i_{time}/\Delta^i_{space}$ ratio.

There are several ways to reduce the computation time of the estimation: (1) When discarding the list $l_i$, those queries whose strings do not have the gram of $l_i$ will not be affected, since they will still have the same set of nonhole grams as before. Therefore, we only need to re-evaluate the performance of the queries whose strings have this gram of $l_i$. In order to find these strings efficiently, we build an inverted-list index structure for the queries, similar to the way we construct inverted lists for the strings in the collection. When discarding the list $l_i$, we can just consider those queries on the query inverted list of the gram for $l_i$. (2) We run the algorithm on a random subset of the strings. As a consequence, (i) we can make sure the entire inverted lists of these sample strings can fit into a given amount of memory. (ii) We can reduce the array size in the ISC algorithm, as well as its scan time to find candidates. (iii) We can reduce the number of lists to consider initially since some infrequent grams may not appear in the sample strings. (3) We run the algorithm on a random subset of the queries in the workload Q, assuming this subset has the same distribution as the workload. As a consequence, we can reduce the computation to estimate the scan time, merging time, and post-processing time (using the ISC algorithm). (4) We do not discard those very short lists, thus we can reduce the number of lists to consider initially. (5) In each iteration of the algorithm, we choose multiple lists to discard based on the effect on the index size and overall query performance. In addition, for those lists that have very poor time effects (i.e., they affect the overall performance too negatively), we do not consider them in future iterations, i.e., we have decided to keep them in the index structure. In this way we can reduce the number of iterations significantly.

Consider the combining of inverted lists. In this section, we disclose how to reduce the size of an inverted-list index by combining some of the lists. Intuitively, when the lists of two grams are similar to each other, using a single inverted list to store the union of the original two lists for both grams could save some space. One subtlety in this approach is that the string IDs on a list are treated as a set of ordered elements (without duplicates), instead of a bag of elements. By combining two lists we mean taking the union of the two lists so that space can be saved. Notice that the T lower bound in the T-occurrence problem is derived from the perspective of the grams in the query. (See Equation 1 above as an example.) Therefore, if a gram appears multiple times in a data string in the collection (with different positions), on the corresponding list of this gram the string ID appears only once. If we want to use the positional filtering technique (mainly for the edit distance function) for each string ID on the list of a gram, we can keep a range of the positions of this gram in the string, so that we can utilize this range to do filtering. When taking the union of two lists, we need to accordingly update the position range for each string ID.

We will first discuss the data structure and the algorithm for efficiently combining, and then analyze the effects of combining lists on query performance. We also show that an index with combined inverted lists gives us a new opportunity to improve the performance of list-merging algorithms. We disclose an algorithm for choosing lists to combine in the presence of space constraints.

Consider the data structures for combining lists. In the original inverted-list structure, different grams have different lists. Combining two lists $l_1$ and $l_2$ will produce a new list $l_{new}=l_1 \cup l_2$. The size reduction of combining two lists $l_1$ and $l_2$ can be computed as $$\Delta^{(1,2)}_{size}=|l_1|+|l_2|-|l_1 \cup l_2|=|l_1 \cap l_2|.$$

All grams that shared $l_1$ and $l_2$ (there could be several grams due to earlier combining operations) will now share list $l_{new}$. In this fashion we can support combining more than two lists iteratively. We use a data structure called Disjoint-Set with the algorithm Union-Find to efficiently combine more than two lists, as illustrated in FIG. 7. More details are in the appendix.

Consider the effects of combining lists on query performance. For a similarity query with a string s, if the lists of the grams in G(s) are combined (possibly with lists of grams not in G(s)), then the performance of this query can be affected in the following ways. (1) Different from the approach of discarding lists, the lower bound T in the T-occurrence problem remains the same, since an answer still needs to appear at least this number of times on the lists. Therefore, if a query was not in a panic case before, then it will not be in a panic case after combining inverted lists. (2) The lists will become longer. As a consequence, it will take more time to traverse these lists to find candidates during list merging, and more false positives may be produced to be post-processed.

Focus first on list-merging time. As inverted lists get combined, some of them will become longer. In this sense it appears that combining lists can only increase the list-merging time in query answering. However, the following observation opens up opportunities for us to further decrease the list-merging time, given an index structure with combined lists. We notice that a gram could appear in the query string s multiple times (with different positions), thus these grams share common lists. In the presence of combined lists, it becomes possible for even different grams in G(s) to share lists. This sharing suggests a way to improve the performance of existing list-merging algorithms for solving the T-occurrence problem. A simple way to use one of these algorithms is to pass it a list for each gram in G(s). Thus we pass |G(s)| lists to the algorithm to find string IDs that appear at least T times on these (possibly shared) lists. We can improve the performance of the algorithm as follows. We first identify the shared lists for the grams in G(s). For each distinct list $l_i$, we also pass to the algorithm the number of grams sharing this list, denoted by $w_i$. Correspondingly, the algorithm needs to consider these $w_i$ values when counting string occurrences. In particular, if a string ID appears on the list $l_i$, the number of occurrences should increase by $w_i$, instead of "1" in the traditional setting. Thus we can reduce the number of lists passed to the algorithm, thus possibly even reducing its running time. The prior art algorithms already consider different list weights, and other prior art algorithms can be modified slightly to consider these weights. Interestingly, our experiments showed that, even for the case we do not combine lists, this optimization can already reduce the running time of existing list-merging algorithms by up to 20%.

Focus second on post-processing time. We want to compute the number of candidates generated from the list-merging algorithm. Before combining any lists, the candidate set generated from a list-merging algorithm contains all correct answers and some false positives. We are particularly interested to know how many new false positives will be generated by combining two lists $l_1$ and $l_2$. The ISC algorithm described above can be modified to adapt to this setting.

In the algorithm, a ScanCount vector is maintained for a query Q to store the number of grams Q shares with each string ID in the collection. The strings whose corresponding values in the ScanCount vector are at least T will be candidate answers. By combining two lists $l_1$ and $l_2$, the lists of those grams that are mapped to $l_1$ or $l_2$ will be conceptually extended. Every gram previously mapped to $l_1$ or $l_2$ will now be mapped to $l_1 \cup l_2$. The extended part of $l_1$ is $ext(l_1)=l_2 \setminus l_1$. Let $w(Q, l_1)$ denote the number of times grams of Q reference $l_1$. The ScanCount value of each string ID in $ext(l_1)$ will be increased by $w(Q, l_1)$. Since for each reference, all string IDs in $ext(l_1)$ should have their ScanCount value increased by one, the total incrementation will be $w(Q, l_1)$ (not $w(Q, l_2)$). The same operation needs to be done for $ext(l_2)$ symmetrically. It is easy to see the ScanCount values are monotonically increasing as lists are combined. The strings whose ScanCount values increase from below T to at least T become new false positives after $l_1$ and $l_2$ are combined.

Figure 8:
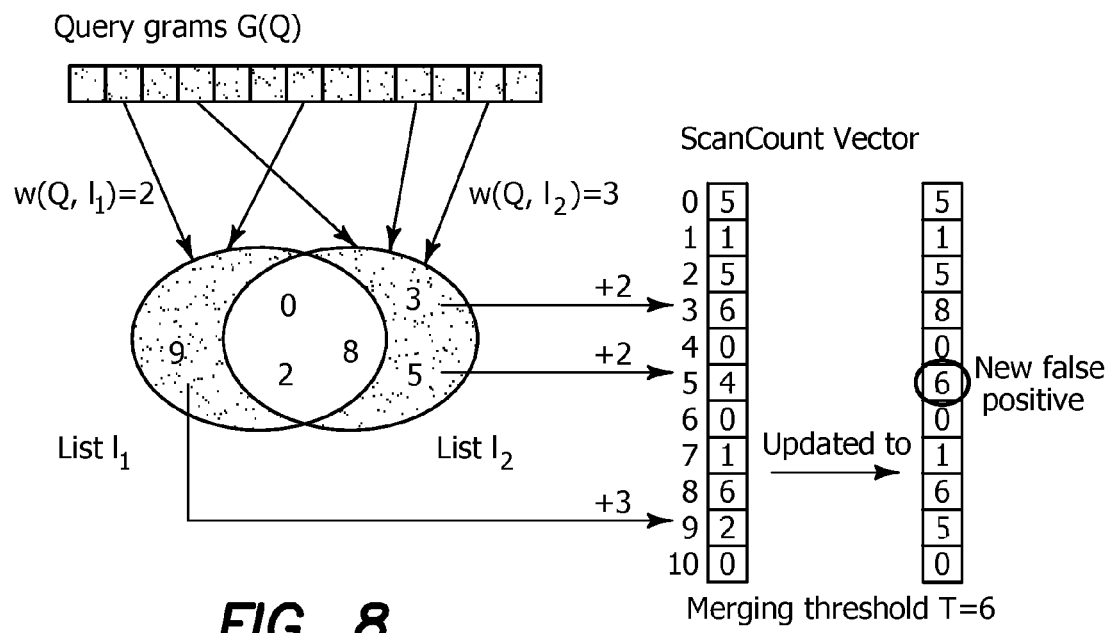
FIG. 8 is a diagram illustrating a query string "Irvine" with two hole grams. A solid horizontal line denotes a nonhole gram, and a dashed line denotes a hole gram. The arrows denote character deletions.

FIG. 8 shows an example, in which $l_1=\{0, 2, 8, 9\}$ $l_2=\{0, 2, 3, 5, 8\}$. Before combining $l_1$ and $l_2$, two grams of Q are mapped to $l_1$ and three grams are mapped to $l_2$. Therefore, $w(Q, l_1)=2$ and $w(Q, l_2)=3$. For every string ID in $ext(l_1)=\{3, 5\}$, their corresponding values in the ScanCount vector will be increased by $w(Q, l_1)$. Let C denote the ScanCount vector. C[3] will be increased from 6 to 8, while C[5] will be increased from 4 to 6. Given the threshold T=6, the change on C[5] indicates that string 5 will become a new false positive. The same operation is carried out on $ext(l_2)$.

Consider now the choosing lists to combine. We use two steps to combine lists: discovering candidate gram pairs, and selecting some of them to combine.

Turn to step 1, discovering candidate gram pairs. We are only interested in combining correlated lists. We can use Jaccard similarity to measure the correlation of two lists, defined as $jaccard(l_1, l_2)=|l_1 \cap l_2| / |l_1 \cup l_2|$. Two lists are considered to be combined only if their correlation is greater than a threshold. Clearly it is computationally prohibitive to consider all pairs of grams. There are different ways for generating such pairs. One way is using adjacent grams. We only consider pairs of adjacent grams in the strings. If we use q-grams to construct the inverted lists we can just consider those (q+1)-grams. Each such gram corresponds to a pair of q-grams. For instance, if q=3, then the 4-gram tion corresponds to the pair (tio, ion). For each such adjacent pair, we treat it as a candidate pair if the Jaccard similarity of their corresponding lists is greater than a predefined threshold. One limitation of this approach is that it cannot find strongly correlated grams that are not adjacent in strings. In the literature there are efficient techniques for finding strongly correlated pairs of lists. One of them is called Locality-Sensitive Hashing (LSH). Using a small number of so-called MinHash signatures for each list, we can use LSH to find those gram pairs whose lists satisfy the above correlation condition with a high probability.

Turn to step 2, selecting candidate pairs to combine. The second step is selecting candidate pairs to combine. One basic algorithm is the following. We iteratively pick gram pairs and combine their lists if their correlation satisfies the threshold. Notice that each time we process a new candidate gram pair, since the list of each of them could have been combined with other lists, we still need to verify their (possibly new) correlation before deciding whether we should combine them. After processing all these pairs, we check if the index size meets a given space constraint. If so, the process stops. Otherwise, we decrease the correlation threshold and repeat the process above, until the new index size meets the given space constraint.

This basic algorithm does not consider the effect of combining two lists on the overall query performance. We propose a cost-based algorithm to wisely choose lists to combine in the second step. FIG. 9 shows the cost-based algorithm which takes the estimated cost of a query workload into consideration when choosing lists to combine. It iteratively selects pairs to combine, based on the space saving and the impact on the average query performance of a query workload Q. The algorithm keeps selecting pairs to combine until the total size of the inverted lists meets a given space constraint B. For each gram pair ($g_i$, $g_j$), we need to get their current corresponding lists, since their lists could have been combined with other lists (lines 3 and 4). We check whether these two lists are the same list as reference (line 5), and also whether their correlation is above the threshold (line 6). Then we compute the size reduction (line 8) and estimate the average query time difference and the ISC algorithm (line 9), based on which we decide the next list pair to combine (lines 10 and 11). We can use similar optimization techniques as described above to improve the performance of CombineLists.

In summary, (1) CombineLists and DiscardLists can significantly outperform Carryover-12 at the same memory reduction ratio because of the online decompression required by Carryover-12. (2) For small compression ratios CombineLists performs best, even outperforming VGRAM. (3) For large compression ratios DiscardLists delivers the best query performance. (4) While Carryover-12 can achieve reductions up to 60% and VGRAM up to 30%, neither allows explicit control over the reduction ratio. DiscardLists and CombineLists offer this flexibility with good query performance.

Consider integrating several approaches. The methods studied in this disclosure are indeed orthogonal, thus we could even use their combinations to further reduce the index size and/or improve query performance. As an example, we integrated CombineLists with Carryover-12. We first compressed the index using CombineLists approach with a reduction α, and then applied Carryover-12 on the resulting index. We varied α from 0 (no reduction for CombineLists) to 60% in 10% increments. The results of the overall reduction ratio and the average query time are shown in the "CL+Carryover-12" curve in FIG. 17. The leftmost point on the curve corresponds to the case where α=0. For comparison purposes, we also plotted the results of using the CombineLists alone shown on the other curve. The results clearly show that using both methods we can achieve high reduction ratios with a better query performance than using CombineLists alone. Consider the first point that only uses Carryover-12. It could achieve a 48% reduction with an average query time of 7.3 ms. By first using CombineLists at a 30% ratio (4th point on the curve) we could achieve a higher reduction ratio (61%) at a lower query time (6.34 ms).

One way to integrate multiple methods is to distribute the global memory constraint among several methods. Notice since Carryover-12 and VGRAM do not allow explicit control of the index size, it is not easy to use them to satisfy an arbitrary space constraint. Several open challenging problems need more future research. First, we need to decide how to distribute the global memory constraint among different methods. Second, we need to decide in which order to use them. For example, if we use CombineLists first, then we never consider discarding merged lists in DiscardLists. Similarly, if we run DiscardLists first, then we never consider combining any discarded list in CombineLists.

Therefore, in conclusion the illustrated embodiments of the invention include an improvement in an indexing method for efficient approximate string search of a query string s against a collection of data strings S corresponding to a gram dictionary D in a computer system comprising: preprocessing the dictionary D into a plurality of grams of varying length between $q_{min}$ and $q_{max}$; starting from a current position in the query string s, searching for the longest substring that matches a gram in the dictionary D, if no such gram exists in the dictionary D, then materializing a substring of length $g_{min}$ starting from the current position; checking if the found or materialized substring is a positional substring already found in the query string s, and if so, then not producing a positional gram corresponding to the found or materialized substring, otherwise producing a positional gram corresponding to the found or materialized substring; and indexing the current position by one to the right in the query string and repeating the searching and checking until the current position in the query string s is greater than |s|−$q_{min}$+1, where |s| is the length of query string s, so that a gram index list for query string s having variable gram length is generated denoted as the set of positional grams VG(s, D, $q_{min}$, $q_{max}$).

The step of preprocessing the dictionary D into a plurality of grams of varying length between $q_{min}$ and $q_{max}$ comprises: generating a frequency trie of $q_{max}$-grams for the strings for the dictionary D; collecting gram frequencies by counting on a trie without generating the shorter grams for the dictionary D, except for those grams at the end of a strings and selecting high quality grams.

The step of collecting gram frequencies for the dictionary D comprises: initializing the frequency trie to be empty; for each string s, generating all its positional $q_{max}$-grams; for each $q_{max}$-gram locating the corresponding leaf node by inserting the $q_{max}$-gram into the trie if the gram has not been previously inserted (the frequency for the corresponding leaf node being initialized to 0); for each node on that path connecting the root of the trie to the leaf node corresponding to the last inserted $q_{max}$-gram, including this leaf node, incrementing its frequency by 1 thereby assigning thereto a frequency value n.freq; and at each q-th node ($q_{min} \leq q \leq q_{max}$) on the path, creating a leaf node by appending an edge with an endmarker symbol #, if this new leaf node has not been previously inserted into the trie, signifying that the $q_{max}$-gram has a prefix gram of length q that ends at this leaf node marking the edge.

For each string s the step of generating all its positional $q_{max}$-grams comprises processing characters at the end of each string separately, since these characters do not produce positional $q_{max}$-grams, for each position p=|s|−$q_{max}$+2, : : : , |s|−$q_{min}$+1 of the string, generating a positional gram of length |s|−p+1, and for each positional gram of length |s|−p+1 locating the corresponding leaf node by inserting the positional gram of length |s|−p+1 into the trie if the gram has not been previously inserted (the frequency for the corresponding leaf node being initialized to 0), for each node on that path connecting the root of the trie to the leaf node corresponding to the last inserted positional gram of length |s|−p+1, including this leaf node, incrementing its frequency by 1 thereby assigning thereto a frequency value n.freq; and at each q-th node ($q_{min} \leq q \leq q_{max}$) on the path, creating a leaf node by appending an edge with an endmarker symbol #, if this new leaf node has not been previously inserted into the trie, signifying that the positional gram of length |s|−p+1 has a prefix gram of length q that ends at this leaf node marking the edge.

The step of selecting high quality grams comprises: if a gram g has a low frequency, eliminating from the frequency trie all the extended grams of g; and if a gram is very frequent, keeping selected ones of the corresponding extended grams in the frequency trie.

If a gram g has a low frequency, the step of eliminating from the frequency trie all the extended grams of g comprises: choosing a frequency threshold, T; and pruning the frequency trie by checking nodes from the root down to determine if a current node n has a leaf-node child marked by an edge labeled by the end marker symbol #, if the current node n does not have any leaf-node child, then the path from the root to the current node n corresponds to a gram shorter than $q_{min}$, thus recursively pruning the frequency trie for each of the current node n's children, if the current node n node has a leaf-node child L, then materializing a gram g corresponding to L with the frequency of node n, n.freq, if the frequency n.freq is already not greater than T, then we keeping the gram corresponding to leaf-node child L in the frequency trie, and then removing the children of current node n except for leaf-node child L, and assigning a frequency of n to leaf-node child L, so that after this pruning step, current node n has a single leaf-node child L.

If a gram is very frequent, the step of keeping selected ones of the corresponding extended grams in the frequency trie comprises if n.freq>T, selecting a maximal subset of the current node n's children excluding leaf-node child L to remove, so that the summation of the frequencies of the maximal subset of the current node and the frequency of the leaf-node child, L.freq, is not greater than T, adding the summation of the frequencies of the maximal subset of the current node to the frequency of the leaf-node child, and for the remaining children the current node n, excluding leaf-node L, recursively pruning the subtrie.

The step of selecting a maximal subset of the current node n's children excluding leaf-node child L comprises choosing children with the smallest frequencies to remove, choosing children with the largest frequencies to remove, or randomly selecting children to remove so that the frequency of the leaf-node child, L.freq, is not greater than T after addition of the frequencies of the selected children which have been removed into the leaf-node child L's frequency.

The illustrated embodiments include an improvement in a method for determining for each string s in a collection S, how many grams in VG(s) can be affected by k edit operations, where VG(s) is a variable-length positional gram index of the string s, comprising precomputing an upper bound of the number of grams in VG(s) which can be affected by k edit operations for each possible k value; storing the values of the upper bound for different k values in a vector for s, defined as the vector of the number of affected grams of string s, denoted by NAG(s) and where the $k^{th}$ number in the NAG vector is denoted by NAG(s, k); and using the upper bound to improve the performance of string search algorithms.

For a string $s_i$, VG($s_i$) and NAG($s_i$) are defined as a corresponding set of variable-length positional grams and NAG vector of $s_i$, respectively, and given that two strings $s_1$ and $s_2$ have ed($s_1$, $s_2$)≦k, the embodiment further comprises generating a lower bound, $B_{vc}(s_1, s_2, k)$, on the number of common grams (ignoring positional information) between VG($s_1$) and VG($s_2$) using the same gram dictionary D as defined by $B_{vc}(s_1, s_2, k)$=max{|VG($s_1$)|−NAG($s_1$, k), |VG($s_2$)|−NAG($s_2$, k)} or generating an upper bound on a hamming distance, $B_{vh}(s_1, s_2, k)$, between two sets of grams of variable length VG($s_1$) and VG($s_2$) corresponding to the strings $s_1$ and $s_2$, treated as bit vectors (ignoring positional information) using the same gram dictionary D as defined by; $B_{vh}(s_1, s_2, k)$=NAG($s_1$, k)+NAG($s_2$, k)

The illustrated embodiments also include an improvement in a method of operating a computer system in processing string data, s, including in a set of strings, S, according to a string algorithm comprising: converting a string to a set of positional variable-length grams, VG(s); and using $B_{vc}(s_1, s_2, k)$=max {|VG($s_1$)|−NAG($s_1$, k), |VG($s_2$)|−NAG($s_2$, k)} as a lower bound on the number of common grams between two compared strings, $s_1$ and $s_2$ in the sting algorithm or as a set-similarity threshold for sets VG($s_1$) and VG($s_2$) corresponding to strings, $s_1$ and $s_2$ respectively.

The illustrated embodiments include an improvement in a method of operating a computer system in processing string data, s, including in a set of strings, S, according to a string algorithm comprising, converting a string to a set of positional variable-length grams, VG(s); and using $B_{vh}(s_1, s_2, k)$=NAG($s_1$, k)+NAG($s_2$, k) as an upper bound on a gram-based hamming distance between two compared strings, $s_1$ and $s_2$, from different string collections $S_1$ and $S_2$ utilized by the string algorithm.

The step of precomputing an upper bound of the number of grams in VG(s) which can be affected by k edit operations for each possible k value which are then stored as NAG(s), where string s' is generated by performing edit operations at the i-th position of a string s, where the number of grams in VG(s) that will no longer exist in VG(s') is at most B[i], the Position-Gram-Bound Vector (PGB Vector) of the string s being defined as <B[1], B[2], . . . , B[|s|]>, and where B[j] is the j-th value in the PGB vector of string s, the improvement comprises: generating an upper bound P(i, j) on the number of grams in VG(s) that can be affected by i edit operations that are at a position no greater than j, where 0≦i≦k and 0≦j≦|s|; for each 0≦i≦k, initializing P(i, 0)=0, and for each 0≦j≦|s|, initializing P(0, j)=0; computing a value for P(i, j), where i>0 and j>0, where there is no edit operation at position j, by setting P(i, j) equal to P(i, j−1), since all the j edit operations occur before or at position j−1, or computing a value for P(i, j), where i>0 and j>0, where there are one or more edit operations at position j, which operations could affect at most B[j] grams of s, for all the grams of s that start from a position before j that cannot be affected by the j edit operations at the j-th position, R(j) being defined as their largest starting position, by setting P(i, j) equal to the summation of P(i−1,R(j)) and B[j], assuming in the worst case that there are i−1 edit operations on positions before or at j; whichever is a maximal value of P(i, j) according to a recurrence function: P(i, j)=max {P(i, j−1), P(i−1, R(j))+B[j] } for each value k of the k edit operations for a string s, the last iteration of the recurrence function for each value k for the string s defining NAG(s).

The illustrated embodiments include an improvement in a method generating a gram dictionary D of a string collection S comprising: sampling strings from S to generate a new collection S' to be used to generate inverted lists for grams in the gram dictionary D; generating $q_{min}$-grams for strings in S' for a predetermined value of $g_{min}$; constructing a trie T from the $q_{min}$-grams in which trie T all the paths starting from the root are of length at least $q_{min}$ and correspond to the grams in the dictionary; initializing each leaf node's complete list and local list of string IDs in the trie T using the generated $q_{min}$-grams, for each node n of trie T, traversing the trie breadth-first to add grams in a predetermined order, and adding grams level-by-level in the trie T by using two queues: a first queue Q including the leaf nodes of the current level, and a second queue $Q_{new}$ including leaf nodes of the next level to be further considered, while maintaining both a complete list and local list of string IDs for each gram, by generating all children of node n corresponding to extended grams of node n in dictionary D by scanning the complete list of node n, generating the complete and local lists for each of the children of node n by identifying the substrings corresponding to the added grams, evaluating whether to add each gram to the dictionary D on a cost basis, and modifying the local list of node n if the gram is added to the trie T, adding the child node c to the trie T, and modifying all other nodes at the same level as node n corresponding to the added gram, otherwise removing the child node c from the trie T if the evaluation of the gram on a cost basis so indicates; and after evaluating all extended grams for a node n, removing the complete list of node n.

The step of traversing the trie breadth-first to add grams in a predetermined order comprises choosing a child with the shortest local list, choosing a child with the longest local list, or randomly selecting a child.

The step of generating all children of node n corresponding to extended grams of node n in dictionary D by scanning the complete list of node n comprises for each string s on the complete list of n, considering the substring s[i, j] corresponding to the gram of n, if the string has a substring s[i, j+1], adding a child of node n with the character s[j], if this child is not present.

The step of evaluating whether to add each gram to the dictionary D on a cost basis comprises running a query workload W using the new gram dictionary D' after adding gram g, and comparing the performance with that on the original dictionary D, if performance improves, then adding gram g to the dictionary.

The step of evaluating whether to add each gram to the dictionary D on a cost basis comprises estimating how adding the gram g affects the inverted lists for node n and node n' by estimating the size of each of the two inverted lists corresponding to node n and node n' by assuming all the string IDs in the new inverted list of the added gram g will be removed from the original local lists of node n and node n', and then determining performance based on the new inverted list of the assumed size for the added gram g.

The step of evaluating whether to add each gram to the dictionary D on a cost basis comprises estimating the amount of time to access the inverted lists of the grams from a query string Q by counting the frequency of each string ID, adding the string ID to a set of candidates if its frequency is at least a predetermined threshold, where the time complexity is estimated as O(M log h), where h is the number of grams of string Q, and M is the total size of the lists of the grams which meet the threshold condition.

Reduction on the list-access time for queries can be estimated as $p_2 \times T_2 + p_3 \times T_3 + p_4 \times T_4$ where $p_2$, $p_3$ and $p_4$ are the number of queries in query workload W belonging to cases 2, 3, and 4 below, respectively, h=|VG(Q, D)|, where VG(Q, D) is the set of grams for query Q in variable-length gram dictionary D, M is the total length of the lists of grams in VG(Q, D), and H be the average of the h values for all the queries in a workload W of queries Q.

Case 1: If Q does not have a substring of $g_1$ nor $g_2$, then the time to access the lists of grams of Q does not change after adding g;

Case 2: If Q has only one substring of $g_1$ or $g_2$, then after adding g, the new list-access time is estimated as: $\alpha((M-|L(g,D')|) \log h)$, in which $\alpha$ is a constant to convert list length to running time, so that the reduced time is estimated as $T2=\alpha(|L(g,D')| \log H)$;

Case 3: If Q has only one substring of g, then after adding g, the new list-access time can be estimated as $\alpha((M-|L(g_1,D)|-|L(g_2,D)|+|L(g,D')|) \log (h+1))$ so that the reduced time can be estimated as $T3=\alpha((|L(g_1,D)|+|L(g_2,D)|-|L(g,D')|) \log H)$;

Case 4: If Q has both $g_1$ and $g_2$, but no g, then after adding g, the new list-access time can be estimated as $\alpha(M-2|L(g,D')| \log (h))$ so that the reduced time can be estimated as $T4=\alpha(2|L(g,D')| \log H)$, and incrementally generating a trie $T_W$ for the grams from the queries Q breadthwise node by node, so that the number of queries $p_2$, $p_3$, and $p_4$ are determined.

The step of evaluating whether to add each gram to the dictionary D on a cost basis comprises estimating the overall effect of adding gram g on the number of candidates by partitioning queries into a plurality of categories based on the effects of the added gram g on their lower bounds and numbers of candidates, multiplying the number of queries in each category and the estimated benefit for each query in each category, and computing the summation of the estimated benefits.

The illustrated embodiments include an improvement in an indexing method for efficient approximate string search comprising reducing the size of such an indexing structure to a predetermined amount or less of memory space in a computer system, while retaining efficient query processing by discarding selected gram lists, and/or combining correlated gram lists which make up the indexing structure.

The step of reducing the size of such an indexing structure to a predetermined amount or less of memory space in a computer system, while retaining efficient query processing by discarding selected gram lists comprises applying a cost-based algorithm, DiscardLists, which selects gram lists to discard based on evaluated effects on query performance caused by discarding the selected gram list, $l_i$ and then discarding the selected gram lists.

The cost-based algorithm, DiscardLists comprises computing a reduction, $\Delta^i_{size}$, in total list size to determine effect on query performance by the selected gram list $l_i$, computing a reduction, $\Delta^i_{time}$, in average query time for a workload Q to determine effect on query performance by the selected gram list $l_i$ or both.

The step of discarding the selected gram list, $l_i$ comprises discarding the list $l_i$ which has the smallest reduction, $\Delta^i_{size}$, in total list size, discarding the list $l_i$ which has the smallest reduction, $\Delta^i_{time}$, in average query time for a workload Q, or discarding the list $l_i$ which has the smallest $\Delta^i_{time}/\Delta^i_{size}$ ratio, discarding the longest lists, discarding the shortest lists, or randomly discarding lists.

The step of computing the reduction, $\Delta^i_{size}$, computing a reduction, $\Delta^i_{time}$, or both comprises providing an inverted-list index structure only for queries on the query inverted list of the gram for the selected list $l_i$.

The step of computing the reduction, $\Delta^i_{size}$, computing a reduction, $\Delta^i_{time}$, or both comprises running cost-based algorithm DiscardLists on a random subset of strings.

The step of computing the reduction, $\Delta^i_{size}$, computing a reduction, $\Delta^i_{time}$, or both comprises running cost-based algorithm, DiscardLists, on a random subset of queries in the workload, Q.

The step of computing the reduction, $\Delta^i_{size}$, computing a reduction, $\Delta^i_{time}$, or both comprises computing the reduction, $\Delta^i_{size}$, computing a reduction, $\Delta^i_{time}$, or both only on gram lists having a predetermined size or greater.

The step of computing the reduction, $\Delta^i_{size}$, computing a reduction, $\Delta^i_{time}$, or both comprises discarding more than one selected gram list $l_i$.

The step of computing the reduction, $\Delta^i_{size}$, computing a reduction, $\Delta^i_{time}$, or both comprises retaining exempting gram lists $l_i$ whose deletion negatively affects query performance beyond a predetermined threshold from further iterations of application by the cost-based algorithm, DiscardLists.

The improvement further comprises computing a new lower bound on the number of common grams, whose lists are not discarded, shared by two strings r and s, using T'=|G(s)|−H−k×q where s is a string in a collection S, T' is the new lower bound in the T-occurrence problem to find all strings that appear at least T' times on a nonhole gram list as a candidate for a query match, where G(s) is a set of positional q-grams, |G(s)| is the length of G(s), H is the number of hole gram in G(s), k is the maximum distance of a string r from s, and q the length of the positional gram in G(s).

The improvement further comprises computing a new lower bound on the number of common q-grams, whose lists are not discarded, shared by two strings r and s, using T'=|s|+q−1−$D_{max}$ where is a string in a collection S, T' is the new lower bound in the T-occurrence problem to find all strings that appear at least T' times on a nonhole gram list as a candidate for a query match, H is the number of hole gram in G(s), $$P(i, j) = \max \begin{cases} g_i \text{ is a hole: } P(i-1, j) \\ g_i \text{ is a gram: } \begin{cases} \text{delete/substitute } i: \\ P(i-q, j-1) + D_i^{d/s} \\ \text{insertion after } i: \\ P(i-q+1, j-1) + D_i^{ins} \\ \text{noop } i: \\ P(i-1, j) \end{cases} \end{cases}$$

where P(i, j) is an upper bound on the number of grams that can be destroyed by j edit operations on string s that are at positions no greater than i, where $D^{d/s}_i$ is the maximum possible number of grams destroyed by a deletion or substitution operation on string s at position i, and where $D^{ins}_i$ is the maximum possible number of grams destroyed by an insertion operation on string s after position i.

The step of reducing the size of such an indexing structure to a predetermined amount or less of memory space in a computer system, while retaining efficient query processing by combining correlated gram lists which make up the indexing structure comprises combining two lists $l_i$ and $l_j$ when similar into a union of the lists, $l_i \cup l_j$ and updating position ranges for each string ID in the union of the lists.

The step of combining two lists $l_i$ and $l_j$ when similar into a union of the lists, $l_i \cup l_j$ comprises identifying candidate gram pairs and selecting candidate gram pairs whose lists are to be combined.

The step of identifying candidate gram pairs comprises measuring correlation of two lists corresponding to a gram pair, and identifying the measured gram pairs as candidate gram pairs if the correlation is equal to or greater than a predetermined threshold.

The step of measuring correlation of two lists comprises computing jaccard $(l_i, l_j) = |l_i \cap l_j|/|l_i \cup l_j|$.

The step of identifying candidate gram pairs comprises considering only adjacent pairs of grams in a list.

The step of identifying candidate gram pairs comprises using Locality-Sensitive Hashing to find strongly correlated pairs of grams.

The step of selecting candidate gram pairs whose lists are to be combined comprises using a cost-based algorithm, CombineLists, which takes an estimated cost of a query workload into consideration when choosing lists to combine based on space saving and impact on average query performance of a query workload Q.

The candidate gram pairs are selected until total size of the corresponding inverted lists equals a space constraint, B and further comprising providing current corresponding lists $(l_i, l_j)$ for each candidate gram pair, checking whether the current corresponding lists $(l_i, l_j)$ are the same list as a reference list and whether correlation of the current lists $(l_i, l_j)$ is above the predetermined threshold, computing size reduction, $\Delta^{(li, lj)}_{size}$, if the current lists $(l_i, l_j)$ were to be combined, or computing time reduction, $\Delta^{(li, lj)}_{time}$, queries in workload Q if the current lists $(l_i, l_j)$ were to be combined or both, determining based on size reduction, $\Delta^{(li, lj)}_{size}$, and/or time reduction, $\Delta^{(li, lj)}_{time}$, queries in workload Q whether to combine current lists $(l_i, l_j)$, combining the current lists $(l_i, l_j)$ when combination is determined, and removing combined gram from candidate gram pairs if lists are combined.

The cost-based algorithm, CombineLists comprises computing a reduction, $\Delta^i_{size}$, in total list size to determine effect on query performance by the selected gram list $l_i$, computing a reduction, $\Delta^i_{time}$, in average query time for a workload Q to determine effect on query performance by the selected gram list $l_i$ or both.

The step of combining the current lists $(l_i, l_j)$ when combination is determined comprises combining the current lists $(l_i, l_j)$ which have the smallest size reduction, $\Delta^{(li, lj)}_{size}$, the current lists $(l_i, l_j)$ which have the smallest time reduction, $\Delta^{(li, lj)}_{time}$, for queries in workload Q, combining the current lists $(l_i, l_j)$ which have the smallest $\Delta^{(li, lj)}_{time}/\Delta^{(li, lj)}_{size}$ ratio, combining the longest current lists $(l_i, l_j)$, combining the shortest current lists $(l_i, l_j)$, or randomly combining current lists $(l_i, l_j)$.

The step of computing size reduction, $\Delta^{(li, lj)}_{size}$, if the current lists $(l_i, l_j)$ were to be combined, or computing time reduction, $\Delta^{(li, lj)}_{time}$, for queries in workload Q if the current lists $(l_i, l_j)$ were to be combined or both comprises providing an inverted-list index structure only for queries on the query inverted lists of the gram pairs for the selected current lists $(l_i, l_j)$.

The step of computing size reduction, $\Delta^{(li, lj)}_{size}$, if the current lists $(l_i, l_j)$ were to be combined, or computing time reduction, $\Delta^{(li, lj)}_{time}$, for queries in workload Q if the current lists $(l_i, l_j)$ were to be combined or both comprises running cost-based algorithm, CombineLists, on a random subset of strings in each of the current list $(l_i, l_j)$.

The step of computing size reduction, $\Delta^{(li, lj)}_{size}$, if the current lists $(l_i, l_j)$ were to be combined, or computing time reduction, $\Delta^{(li, lj)}_{time}$, for queries in workload Q if the current lists $(l_i, l_j)$ were to be combined or both comprises running cost-based algorithm, CombineLists, on a random subset of queries in the workload, Q.

The step of computing size reduction, $\Delta^{(li, lj)}_{size}$, if the current lists $(l_i, l_j)$ were to be combined, or computing time reduction, $\Delta^{(li, lj)}_{time}$, for queries in workload Q if the current lists $(l_i, l_j)$ were to be combined or both comprises computing the size reduction, $\Delta^{(li, lj)}_{size}$, computing the time reduction, $\Delta^{(li, lj)}_{time}$, or both only on current gram list $(l_i, l_j)$ having a predetermined size or greater.

The step of computing size reduction, $\Delta^{(li, lj)}_{size}$, if the current lists $(l_i, l_j)$ were to be combined, or computing time reduction, $\Delta^{(li, lj)}_{time}$, or queries in workload Q if the current lists $(l_i, l_j)$ were to be combined or both comprises combining more than one pair of selected gram lists $(l_i, l_j)$.

The step of computing size reduction, $\Delta^{(li, lj)}_{size}$, if the current lists $(l_i, l_j)$ were to be combined, or computing time reduction, $\Delta^{(li, lj)}_{time}$, for queries in workload Q if the current lists $(l_i, l_j)$ were to be combined or both comprises exempting pairs of gram lists $(l_i, l_j)$ from combination whose combination negatively affects query performance beyond a predetermined threshold from further iterations of application by the cost-based algorithm, CombineLists.

The illustrated embodiments include a memory medium for storing a plurality of instructions for controlling a computer to perform the above methods.

In this disclosure, we studied how to reduce the size of inverted-list index structures of string collections to support approximate string queries. We studied how to adopt existing inverted-list compression techniques to achieve the goal, and proposed two novel methods for achieving the goal: one is based on discarding lists, and one based on combining correlated lists. They are both orthogonal to existing compression techniques, exploit a unique property of our setting, and offer new opportunities for improving query performance. We studied technical challenges in each method, and proposed efficient, cost-based algorithms for solving related problems. Our extensive experiments on real data sets show that our approaches provide applications the flexibility in deciding the tradeoff between query performance and indexing size and can outperform existing compression techniques.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An improvement in an indexing method for efficient approximate string search of a query string s against a collection of data strings S corresponding to a gram dictionary D in a computer system comprising:
   preprocessing the dictionary D into a plurality of grams of varying length between $q_{min}$ and $q_{max}$;
   starting from a current position in the query string s, searching for the longest substring that matches a gram in the dictionary D, if no such gram exists in the dictionary D, then materializing a substring of length $g_{min}$ starting from the current position;
   checking if the found or materialized substring is a positional substring already found in the query string s, and if so, then not producing a positional gram corresponding to the found or materialized substring, otherwise producing a positional gram corresponding to the found or materialized substring; and
   indexing the current position by one to the right in the query string and repeating the searching and checking until the current position in the query string S is greater than $|s|-q_{min}+1$, where $|s|$ is the length of query string s, so that a gram index list for query string s having variable gram length is generated denoted as the set of positional grams VG(s, D, $q_{min}$, $q_{max}$).

2. The improvement of claim 1 where preprocessing the dictionary D into a plurality of grams of varying length between $q_{min}$ and $q_{max}$ comprises:
   generating a frequency trie of $q_{max}$-grams for the strings for the dictionary D;
   collecting gram frequencies by counting on a trie without generating the shorter grams for the dictionary D, except for those grams at the end of a string; and
   selecting high quality grams.

3. The improvement of claim 1 further comprising reducing the size of such an indexing structure to a predetermined amount or less of memory space in a computer system, while retaining efficient query processing by discarding selected gram lists, and/or combining correlated gram lists which make up the indexing structure.

4. A memory medium for storing a plurality of instructions for controlling a computer to perform the method of claim 1.

5. The improvement of claim 2 where collecting gram frequencies for the dictionary D comprises:
   initializing the frequency trie to be empty:
   for each string s, generating all its positional $q_{max}$-grams:
   for each $q_{max}$-gram locating the corresponding leaf node by inserting the $q_{max}$-gram into the trie if the gram has not been previously inserted (the frequency for the corresponding leaf node being initialized to 0);
   for each node on that path connecting the root of the trie to the leaf node corresponding to the last inserted $q_{max}$-gram, including this leaf node, incrementing its frequency by 1 thereby assigning thereto a frequency value n.freq; and
   at each q-th node ($q_{min} \leq q \leq q_{max}$) on the path, creating a leaf node by appending an edge with an endmarker symbol #, if this new leaf node has not been previously inserted into the trie, signifying that the $q_{max}$-gram has a prefix gram of length q that ends at this leaf node marking the edge.

6. The improvement of claim 2 where selecting high quality grams comprises:
   if a gram g has a low frequency, eliminating from the frequency trie all the extended grams of g; and
   if a gram is very frequent, keeping selected ones of the corresponding extended grams in the frequency trie.

7. The improvement of claim 5 where for each string s generating all its positional $q_{max}$-grams comprises processing characters at the end of each string separately, since these characters do not produce positional $q_{max}$-grams, for each position $p=|s|-q_{max}+2, :::, |s|-q_{min}+1$ of the string, generating a positional gram of length $|s|-p+1$, and for each positional gram of length $|s|-p+1$ locating the corresponding leaf node by inserting the positional gram of length $|s|-p+1$ into the trie if the gram has not been previously inserted (the frequency for the corresponding leaf node being initialized to 0), for each node on that path connecting the root of the trie to the leaf node corresponding to the last inserted positional gram of length $|s|-p+1$, including this leaf node, incrementing its frequency by 1 thereby assigning thereto a frequency value n.freq; and at each q-th node ($q_{min} \leq q \leq q_{max}$) on the path, creating a leaf node by appending an edge with an endmarker symbol #, if this new leaf node has not been previously inserted into the trie, signifying that the positional gram of length $|s|-p+1$ has a prefix gram of length q that ends at this leaf node marking the edge.

8. The improvement of claim 6 where if a gram g has a low frequency, eliminating from the frequency trie all the extended grams of g comprises:
   choosing a frequency threshold, T; and
   pruning the frequency trie by checking nodes from the root down to determine if a current node n has a leaf-node child marked by an edge labeled by the end marker symbol #, if the current node n does not have any leaf-node child, then the path from the root to the current node n corresponds to a gram shorter than $q_{min}$, thus recursively pruning the frequency trie for each of the current node n's children, if the current node n node has a leaf-node child L, then materializing a gram g corresponding to L with the frequency of node n, n.freq, if the frequency n.freq is already not greater than T, then we keeping the gram corresponding to leaf-node child L in the frequency trie, and then removing the children of current node n except for leaf-node child L, and assigning a frequency of n to leaf-node child L, so that after this pruning step, current node n has a single leaf-node child L.

9. The improvement of claim 6 where if a gram is very frequent, keeping selected ones of the corresponding extended grams in the frequency trie comprises if n.freq>T, selecting a maximal subset of the current node n's children excluding leaf-node child L to remove, so that the summation of the frequencies of the maximal subset of the current node and the frequency of the leaf-node child, L.freq, is not greater than T, adding the summation of the frequencies of the maximal subset of the current node to the frequency of the leaf-node child, and for the remaining children the current node n, excluding leaf-node L, recursively pruning the subtrie.

10. The improvement of claim 9 where selecting a maximal subset of the current node n's children excluding leaf-node child L comprises choosing children with the smallest frequencies to remove, choosing children with the largest frequencies to remove, or randomly selecting children to remove so that the frequency of the leaf-node child, L.freq, is not greater than T after addition of the frequencies of the selected children which have been removed into the leaf-node child L's frequency.

* * * * *